(12) United States Patent
Sumi et al.

(10) Patent No.: US 9,214,027 B2
(45) Date of Patent: Dec. 15, 2015

(54) APPARATUS, METHOD, AND NON-TRANSITORY COMPUTER-READABLE MEDIUM

(71) Applicant: CANON KABUSHIKI KAISHA, Tokyo (JP)

(72) Inventors: Naoki Sumi, Kawasaki (JP); Yusuke Hashii, Tokyo (JP); Hiroyasu Kunieda, Yokohama (JP); Hiroyuki Sakai, Chigasaki (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 13/926,499

(22) Filed: Jun. 25, 2013

(65) Prior Publication Data
US 2014/0010451 A1   Jan. 9, 2014

(30) Foreign Application Priority Data
Jul. 9, 2012 (JP) .................... 2012-154004

(51) Int. Cl.
   *G06K 9/34* (2006.01)
   *G06T 7/00* (2006.01)
   *G06K 9/00* (2006.01)
   *G06T 11/60* (2006.01)

(52) U.S. Cl.
   CPC .......... *G06T 7/0081* (2013.01); *G06K 9/00221* (2013.01); *G06T 11/60* (2013.01)

(58) Field of Classification Search
   None
   See application file for complete search history.

(56) References Cited

U.S. PATENT DOCUMENTS

| | | | |
|---|---|---|---|
| 5,218,387 A | 6/1993 | Ueno et al. | |
| 5,400,200 A | 3/1995 | Bloemendaal et al. | |
| 5,905,807 A | 5/1999 | Kado et al. | |
| 6,885,760 B2 | 4/2005 | Yamada et al. | |
| 6,895,103 B2 | 5/2005 | Chen et al. | |
| 6,965,684 B2 | 11/2005 | Chen et al. | |
| 7,103,218 B2 | 9/2006 | Chen et al. | |
| 7,379,568 B2 | 5/2008 | Movellan et al. | |
| 7,586,524 B2 * | 9/2009 | Tsue et al. ................ | 348/231.2 |
| 7,924,469 B2 | 4/2011 | Ono et al. | |
| 7,944,588 B2 | 5/2011 | Yamada et al. | |
| 8,175,155 B2 | 5/2012 | Suwa et al. | |
| 8,184,337 B2 * | 5/2012 | Sakai ......................... | 358/1.9 |
| 8,237,991 B2 | 8/2012 | Ono et al. | |

(Continued)

FOREIGN PATENT DOCUMENTS

| JP | 05-197793 A | 8/1993 |
|---|---|---|
| JP | 08-063597 A | 3/1996 |

(Continued)

OTHER PUBLICATIONS

U.S. Appl. No. 13/922,802, filed Jun. 20, 2013 to Suwa et al.

(Continued)

*Primary Examiner* — Vikkram Bali
(74) *Attorney, Agent, or Firm* — Fitzpatrick, Cella, Harper & Scinto

(57) ABSTRACT

An apparatus includes a specifying unit configured to specify, based on an image as a candidate of an output target, at least one object region satisfying a predetermined condition from the image, a determination unit configured to determine whether the object region specified in the image by the specifying unit is divided in the image, and a decision unit configured to decide the output target region in the image based on a determination result by the determination unit.

21 Claims, 28 Drawing Sheets

(56) References Cited

U.S. PATENT DOCUMENTS

| | | | |
|---|---|---|---|
| 8,842,934 B2* | 9/2014 | Okuhara et al. | 382/284 |
| 2001/0036298 A1 | 11/2001 | Yamada et al. | |
| 2002/0081032 A1 | 6/2002 | Chen et al. | |
| 2003/0016846 A1 | 1/2003 | Chen et al. | |
| 2006/0018517 A1 | 1/2006 | Chen et al. | |
| 2008/0304718 A1* | 12/2008 | Ryuto et al. | 382/118 |
| 2009/0034840 A1 | 2/2009 | Umeda et al. | |
| 2009/0116752 A1 | 5/2009 | Isomura et al. | |
| 2010/0097642 A1 | 4/2010 | Sumi | |
| 2010/0118052 A1* | 5/2010 | Tsue et al. | 345/629 |
| 2010/0260415 A1 | 10/2010 | Sakai et al. | |
| 2010/0295998 A1 | 11/2010 | Sakai et al. | |
| 2011/0109923 A1 | 5/2011 | Umeda et al. | |
| 2011/0158540 A1 | 6/2011 | Suzuki et al. | |
| 2011/0285871 A1 | 11/2011 | Sakai | |
| 2012/0014453 A1 | 1/2012 | Kawai et al. | |
| 2012/0014565 A1 | 1/2012 | Akiyama et al. | |
| 2012/0268759 A1 | 10/2012 | Ono et al. | |
| 2014/0010459 A1* | 1/2014 | Sumi | G06K 9/46 382/195 |

FOREIGN PATENT DOCUMENTS

| | | |
|---|---|---|
| JP | 08-077334 A | 3/1996 |
| JP | 2541688 B | 7/1996 |
| JP | 11-053525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-030667 A | 1/2003 |
| JP | 3469031 B2 | 11/2003 |
| JP | 2005-044330 A | 2/2005 |
| JP | 2007-026246 A | 2/2007 |
| JP | 2010251999 | 11/2010 |
| JP | 2010273144 | 12/2010 |

OTHER PUBLICATIONS

U.S. Appl. No. 13/930,324, filed Jun. 28, 2013 to Kajiwara et al.

* cited by examiner

F I G. 10

```
<?xml version="1.0" encoding="utf-8" ?>
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                ...
                <Unnecessary>
                        <ID>1</ID>
                        <Position>
                                <LeftTop x=40, y=30/>
                                <LeftBottom x=40, y=230/>
                                <RightTop x=140, y=30/>
                                <RightBottom x=140, y=230/>
                        </Position>
                </Unnecessary>
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>
        </UserInfo>
        ...
</IMAGEINFO>
```

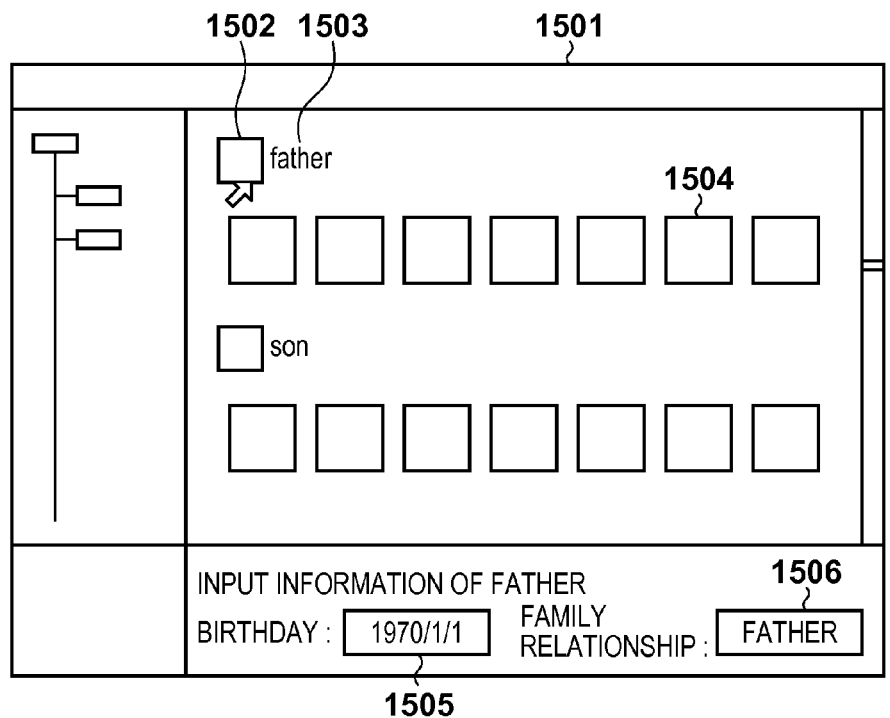

FIG. 16

```xml
<?xml version="1.0" encoding="utf-8" ?>
<LayoutInfo>
        <BASIC>
                    <Theme></Theme>
                    <PageSize>A4</PageSize>
                    <Resolution>300</Resolution>
        </BASIC>
        <ImageSlot>
                    <ID>0</ID>
                    <POSITION>
                                <LeftTop x=100, y=200/>
                                <LeftBottom x=100, y=800/>
                                <RightTop x=1000, y=200/>
                                <RightBottom x=1000, y=800/>
                    </POSITION>
                    <Shape>Rectangle</Shape>
                    <PersonGroup>MainGroup</PersonGroup>
        </ImageSlot>
        <ImageSlot>
                    <ID>1</ID>
                    <POSITION>
                                <LeftTop x=800, y=700/>
                                <LeftBottom x=800, y=1500/>
                                <RightTop x=1700, y=700/>
                                <RightBottom x=1700, y=1500/>
                    </POSITION>
                    <Shape>Rectangle</Shape>
                    <PersonGroup>MainGroup</PersonGroup>
        </ImageSlot>
        <ImageSlot>
                    <ID>2</ID>
                    <POSITION>
                                <LeftTop x=400, y=1600/>
                                <LeftBottom x=1000, y=2200/>
                                <RightTop x=400, y=1600/>
                                <RightBottom x=1000, y=2200/>
                    </POSITION>
                    <Shape>Rectangle</Shape>
                    <PersonGroup>MainGroup</PersonGroup>
        </ImageSlot>
</LayoutInfo>
```

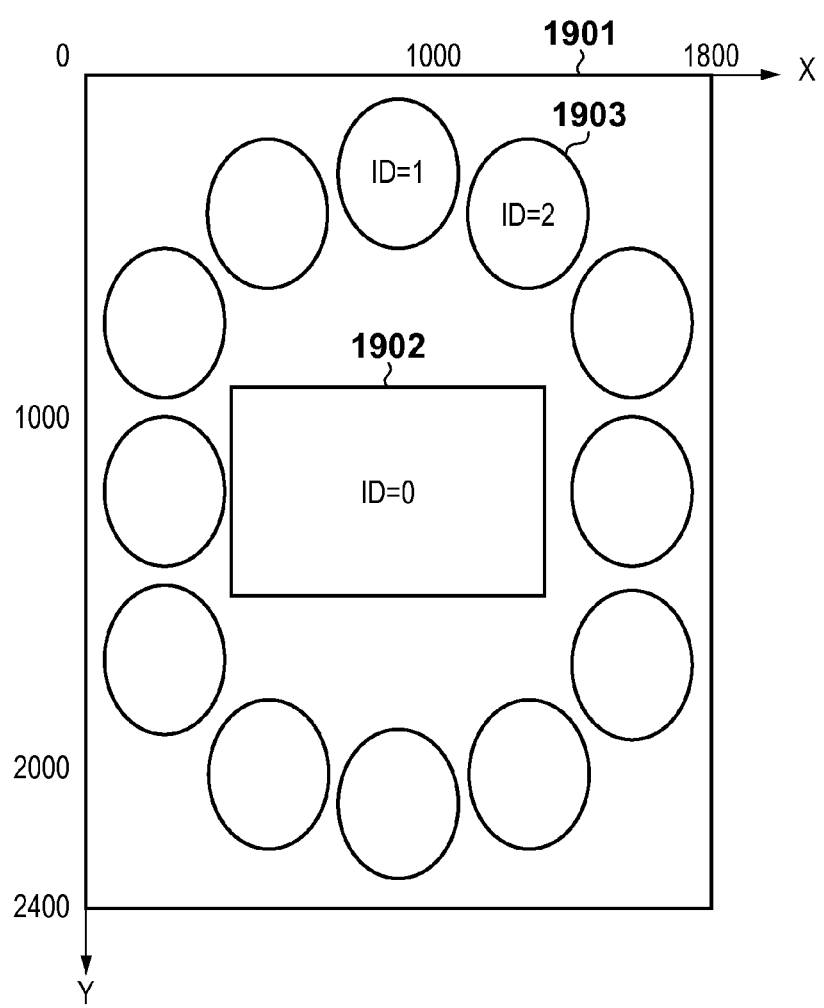
F I G. 17

F I G. 18

```
<?xml version="1.0" encoding="utf-8" ?>
<LayoutInfo>
        <BASIC>
                        <Theme></Theme>
                        <PageSize>A4</PageSize>
                        <Resolution>300</Resolution>
        </BASIC>
        <ImageSlot>
                        <ID>0</ID>
                        <POSITION>
                                        <LeftTop x=400, y=900/>
                                        <LeftBottom x=400, y=1500/>
                                        <RightTop x=1300, y=900/>
                                        <RightBottom x=1300, y=1500/>
                        </POSITION>
                        <Shape>Rectangle</Shape>
                        <PersonGroup>SubGroup</PersonGroup>
        </ImageSlot>
        <ImageSlot>
                        <ID>1</ID>
                        <POSITION>
                                        <LeftTop x=700, y=100/>
                                        <LeftBottom x=700, y=500/>
                                        <RightTop x=1100, y=100/>
                                        <RightBottom x=1100, y=500/>
                        </POSITION>
                        <Shape>ellipse</Shape>
                        <PersonGroup>MainGroup</PersonGroup>
        </ImageSlot>
        <ImageSlot>
                        <ID>2</ID>
                        <POSITION>
                                        <LeftTop x=1100, y=200/>
                                        <LeftBottom x=1100, y=600/>
                                        <RightTop x=1450, y=200/>
                                        <RightBottom x=1450, y=600/>
                        </POSITION>
                        <Shape>ellipse</Shape>
                        <PersonGroup>MainGroup</PersonGroup>
        </ImageSlot>

…….

</LayoutInfo>
```

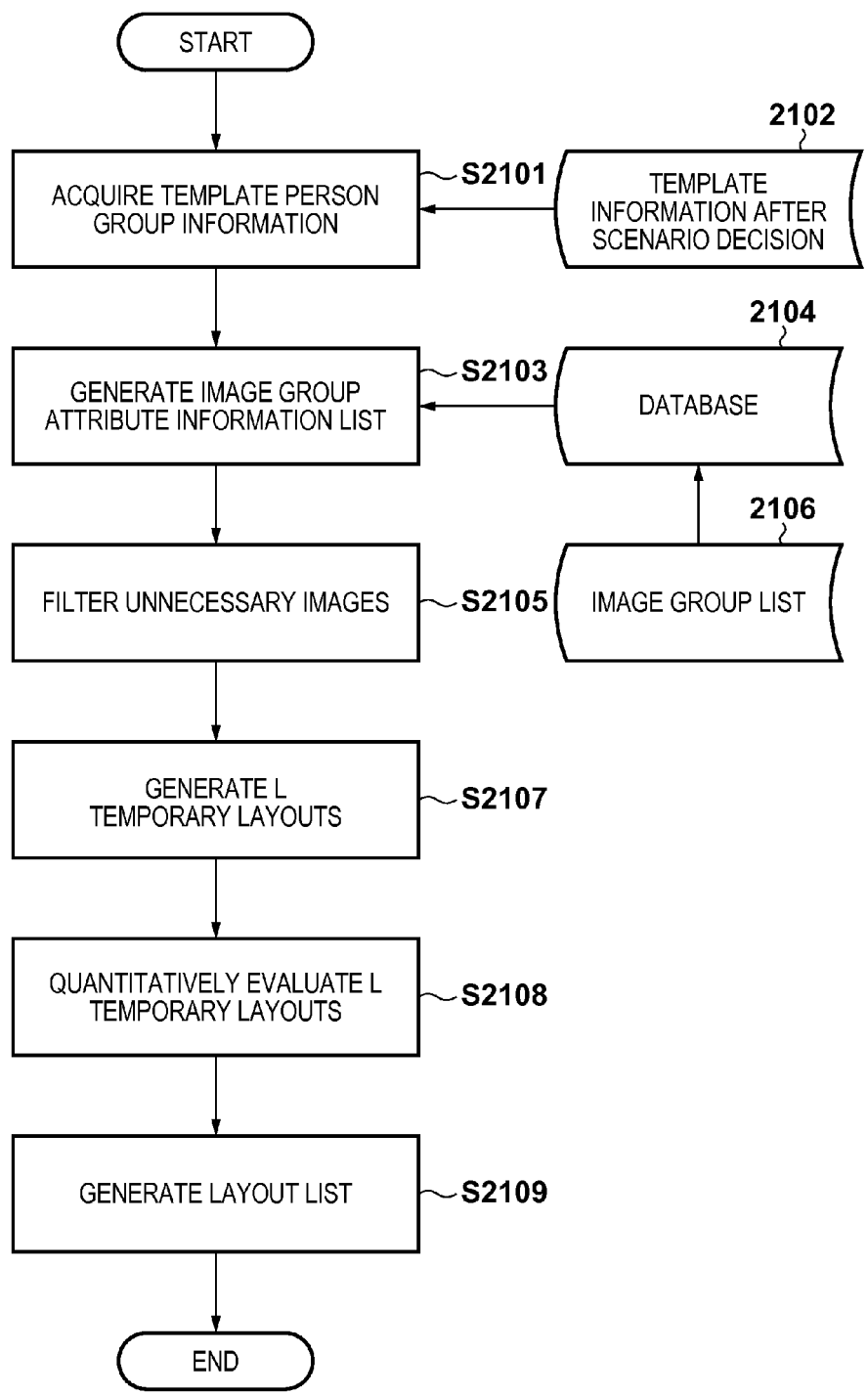

F I G. 24
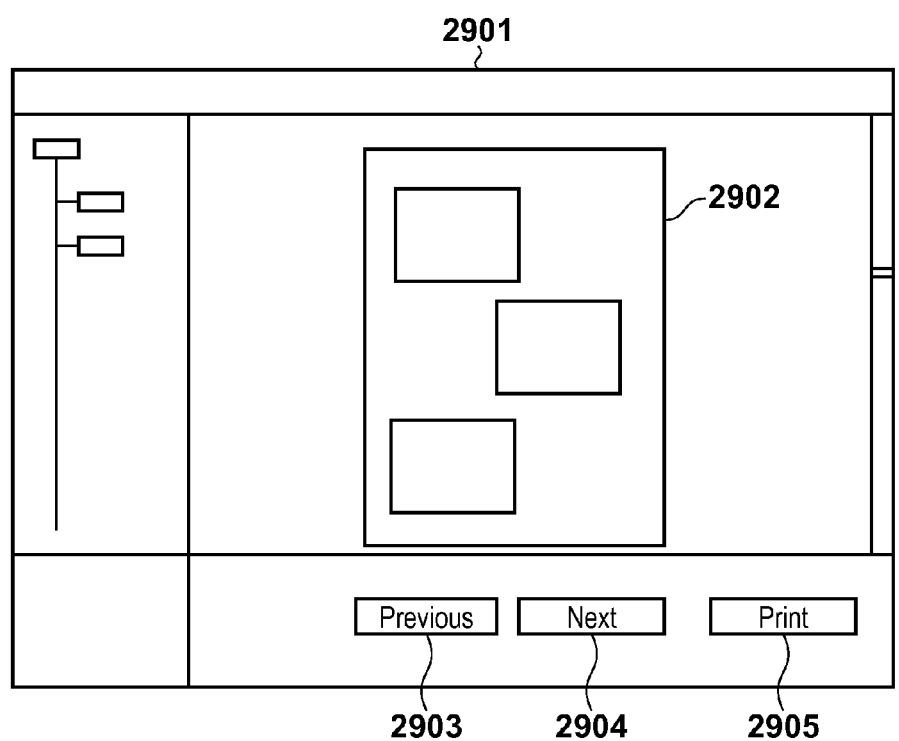

F I G. 25

```xml
<?xml version="1.0" encoding="utf-8" ?>
<LayoutInfo>
        <BASIC>
                        <Theme>growth</Theme>
                        <PageSize>A4</PageSize>
                        <Resolution>300</Resolution>
                        <MainGroup>son</MainGroup>
                        <SubGroup>son, father</SubGroup>
        </BASIC>
        <ImageSlot>
                        <ID>0</ID>
                        <POSITION>
                                        <LeftTop x=400, y=900/>
                                        <LeftBottom x=400, y=1500/>
                                        <RightTop x=1300, y=900/>
                                        <RightBottom x=1300, y=1500/>
                        </POSITION>
                        <Shape>Rectangle</Shape>
                        <PersonGroup>SubGroup</PersonGroup>
        </ImageSlot>
        <ImageSlot>
                        <ID>1</ID>
                        <POSITION>
                                        <LeftTop x=700, y=100/>
                                        <LeftBottom x=700, y=500/>
                                        <RightTop x=1100, y=100/>
                                        <RightBottom x=1100, y=500/>
                        </POSITION>
                        <Shape>ellipse</Shape>
                        <PersonGroup>MainGroup</PersonGroup>
        </ImageSlot>
        <ImageSlot>
                        <ID>2</ID>
                        <POSITION>
                                        <LeftTop x=1100, y=200/>
                                        <LeftBottom x=1100, y=600/>
                                        <RightTop x=1450, y=200/>
                                        <RightBottom x=1450, y=600/>
                        </POSITION>
                        <Shape>ellipse</Shape>
                        <PersonGroup>MainGroup</PersonGroup>
        </ImageSlot>

.......

</LayoutInfo>
```

FIG. 26

```xml
<?xml version="1.0" encoding="utf-8" ?>
<LayoutInfo>
        <BASIC>
                    <Theme>travel</Theme>
                    <PageSize>A4</PageSize>
                    <Resolution>300</Resolution>
                    <MainGroup>son, mother, father</MainGroup>
        </BASIC>
        <ImageSlot>
                    <ID>0</ID>
                    <POSITION>
                                <LeftTop x=100, y=200/>
                                <LeftBottom x=100, y=800/>
                                <RightTop x=1000, y=200/>
                                <RightBottom x=1000, y=800/>
                    </POSITION>
                    <Shape>Rectangle</Shape>
                    <PersonGroup>MainGroup</PersonGroup>
        </ImageSlot>
        <ImageSlot>
                    <ID>1</ID>
                    <POSITION>
                                <LeftTop x=800, y=700/>
                                <LeftBottom x=800, y=1500/>
                                <RightTop x=1700, y=700/>
                                <RightBottom x=1700, y=1500/>
                    </POSITION>
                    <Shape>Rectangle</Shape>
                    <PersonGroup>MainGroup</PersonGroup>
        </ImageSlot>
        <ImageSlot>
                    <ID>2</ID>
                    <POSITION>
                                <LeftTop x=300, y=1700/>
                                <LeftBottom x=300, y=2300/>
                                <RightTop x=1200, y=1700/>
                                <RightBottom x=1200, y=2300/>
                    </POSITION>
                    <Shape>Rectangle</Shape>
                    <PersonGroup>MainGroup</PersonGroup>
        </ImageSlot>
</LayoutInfo>
```

FIG. 27

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
                <ImageID>0x00000001</ImageID>
                <TrimingCrop x=500, y=0, w=2000, h=2000>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
                <ImageID>0x00000089</ImageID>
                <TrimingCrop x=500, y=0, w=2000, h=2000>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
                <ImageID>0x00000129</ImageID>
                <TrimingCrop x=500, y=0, w=2000, h=2000>
        </ImageSlot>
        .......

</LayoutInfo>
```

F I G. 31
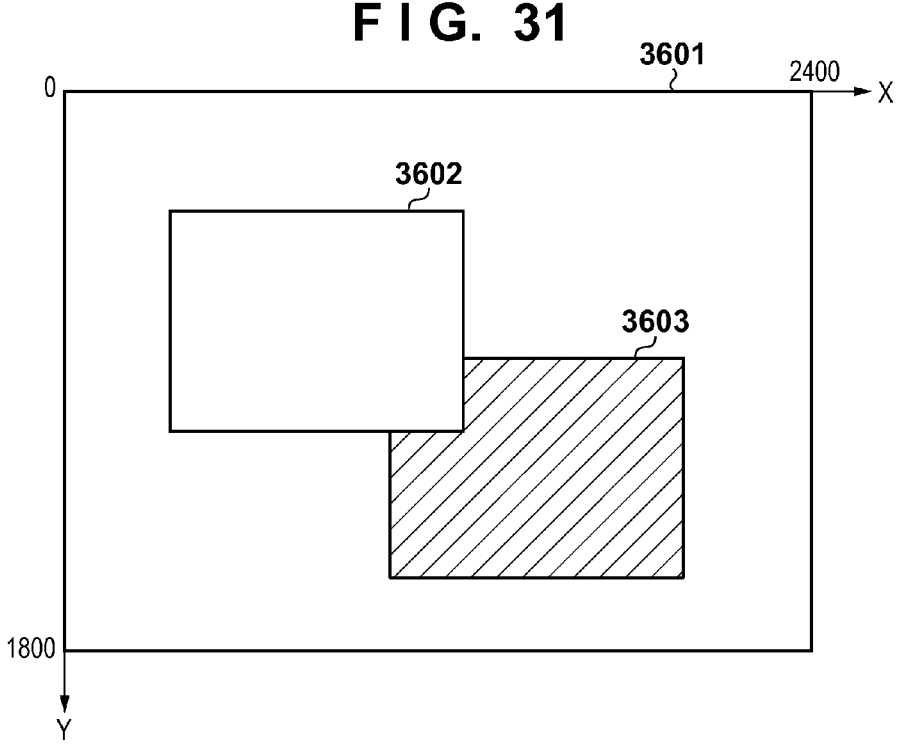
F I G. 32
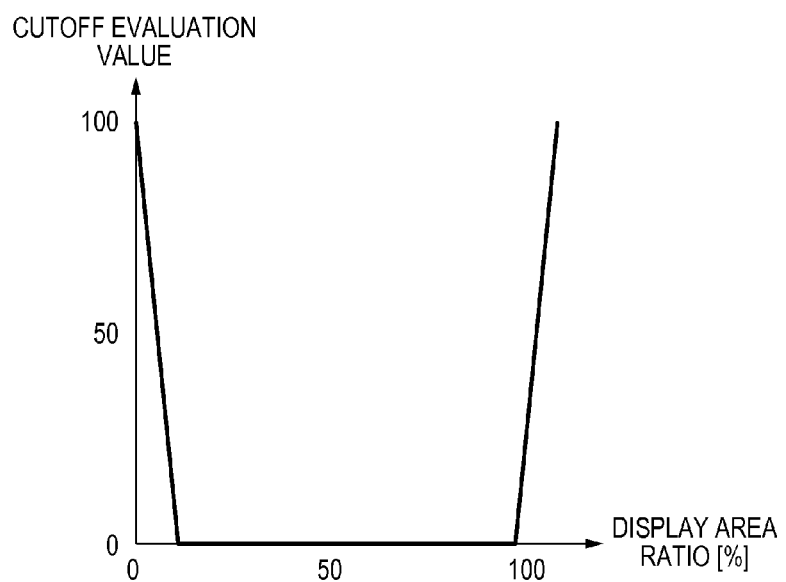

APPARATUS, METHOD, AND NON-TRANSITORY COMPUTER-READABLE MEDIUM

BACKGROUND OF THE INVENTION

1. Field of the Invention

The present invention relates to an apparatus, a method, and a non-transitory computer-readable medium.

2. Description of the Related Art

A technique of automatically insetting an image into a slot of a template and completing a layout image has recently been known in photo printing or video clip creation software. There also exists a technique of, in a template to arrange an image in a layout frame, automatically performing trimming based on the region of the main object of the image to prevent the main object from being partially placed off the layout frame.

Japanese Patent Laid-Open No. 2007-26246 has the following arrangement. A main object region set on a still image and a point of interest for deciding the center of the main object are set. In a layout frame, a reference point that is made to match the point of interest when insetting the still image is set. The ratio of the distance from the reference point to the layout frame to that from the point of interest to the outline of the still image is obtained. The maximum value of the ratio is defined as a first parameter. In addition, the ratio of the distance from the reference point to the layout frame to that from the point of interest to the outline of the main object region is obtained. The minimum value of the ratio is defined as a second parameter. When the first parameter is larger than the second parameter, a blank region issues, or the main object is placed off the album image. Hence, inset of the still image is prohibited.

Japanese Patent Laid-Open No. 2007-26246 describes a technique of automatically deciding the trimming position in consideration of the position of a region of interest such as a person. In this technique, however, the region of interest is sometimes unable to fit in the arrangement region well. For example, a problem may arise when all of a plurality of regions of interest in an image are arranged in arrangement regions such as layout frames (slots) having a fixed aspect ratio. Reference numeral 3401 shown in FIG. 29 denotes a slot (layout frame) to trim and arrange an image; and reference numeral 3402 denotes an image. Reference numerals 3403 (inside the broken line portion) and 3404 (inside the Broken line portion) in the image 3402 denote regions of interest. If all the regions of interest are arranged in the slot 3401 without margins, an image as indicated by reference numeral 3406 is obtained. In image 3406, a cutoff(partial loss) issues in each of the regions 3403 and 3404 of interest so the arrangement does not look fine. Especially when the cutoff issues in a face region, the layout may differ from the user's requirement because, for example, the facial expression is unrecognizable, or the key figure of the photo is unnoticeable.

SUMMARY OF THE INVENTION

The present invention has been made in consideration of the above-described problem, and provides an apparatus capable of appropriately deciding an output target region in an image, a method, and a non-transitory computer-readable medium.

According to one aspect of the present invention, there is provided an apparatus comprising: a specifying unit configured to specify, based on an image as a candidate of an output target, at least one object region satisfying a predetermined condition from the image; a determination unit configured to determine whether the object region specified in the image by the specifying unit is divided in the image; and a decision unit configured to decide the output target region in the image based on a determination result by the determination unit.

According to another aspect of the present invention, there is provided a method comprising: specifying, based on an image as a candidate of an output target, at least one object region satisfying a predetermined condition from the image; determining whether the object region specified in the image in the specifying is divided in the image; and deciding the output target region in the image based on a determination result in the determining.

According to the present invention, it is possible to appropriately decide an output target region in an image.

Further features of the present invention will become apparent from the following description of exemplary embodiments (with reference to the attached drawings).

BRIEF DESCRIPTION OF THE DRAWINGS

FIG. 10 is a view showing an example of an image analysis result saving format;

FIG. 13 is a view showing an example of a UI used to manually input person attribute information;

FIG. 14 is a view showing an example of a person attribute information saving format;

FIG. 16 is a view showing an example of the holding format of the layout template shown in FIG. 15;

FIG. 17 is a view showing an example of a layout template;

FIG. 18 is a view showing an example of the holding format of the layout template shown in FIG. 17;

FIG. 19 is a flowchart of automatic layout proposal processing according to the first embodiment;

FIG. 24 is a view showing a display example of an automatic layout generation result;

FIG. 25 is a view showing an example of holding a decided theme and main character information;

FIG. 26 is a view showing an example of holding a decided theme and main character information;

FIG. 27 is a view showing an example of holding generated automatic layout information;

FIG. 31 is a view showing an example of a layout template;

FIG. 32 is a graph showing an example of a cutoff evaluation value deciding method.

DESCRIPTION OF THE EMBODIMENTS

<First Embodiment>

An embodiment for automatically generating a layout output matter using an input image group will be described below. This merely exemplifies a form of implementation, and the present invention is not limited to the following embodiment.

Note that in this embodiment, the layout output matter is assumed to be a collage output matter formed from one page for the sake of simplicity. However, the present invention may be applied to single sheet printing or an album output including a plurality of pages.

Figure 1:
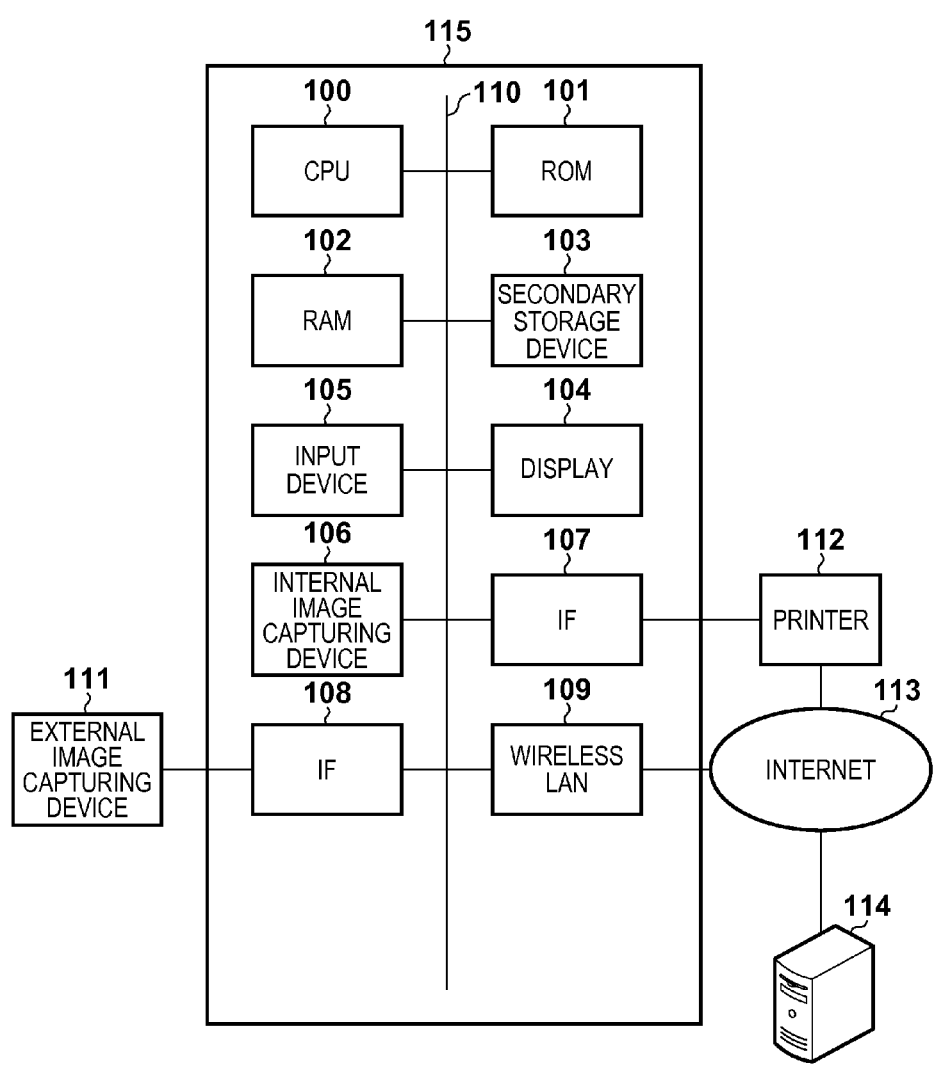
FIG. 1 is a block diagram showing a hardware arrangement capable of executing software of the present invention.

FIG. 1 is a block diagram for illustrating an example of the hardware arrangement of an information processing apparatus according to this embodiment. Referring to FIG. 1, an information processing apparatus 115 includes a CPU 100, a ROM 101, a RAM 102, a secondary storage device 103, a display device 104, an input device 105, an IF 107, an IF 108, and a wireless LAN I/F 109. The information processing apparatus also includes an internal image capturing device 106. They are connected to each other via a control bus/data bus 110. The information processing apparatus 115 of this embodiment functions as an image processing apparatus.

Referring to FIG. 1, the CPU (Central Processing Unit) 100 executes an information processing method to be described in this embodiment in accordance with programs such as an application. The ROM 101 stores the programs to be executed by the CPU 100. The RAM 102 provides a memory to temporarily store various kinds of information when the CPU 100 executes the programs. The secondary storage device 103 is formed from a hard disk or the like and serves as a storage medium to save, for example, a database that saves image files and image analysis results. The display device 104 is, for example, a display, and provides the user processing results of this embodiment or various kinds of UIs (User Interfaces) to be described below. The display device 104 may have a touch panel function. The control bus/data bus 110 connects the above-described units to the CPU 100. The information processing apparatus also includes the input device 105 such as a mouse or a keyboard used by the user to input an image correction processing instruction and the like.

The information processing apparatus 115 may include the internal image capturing device 106. An image captured by the internal image capturing device 106 undergoes predetermined image processing and is saved in the secondary storage device 103. The information processing apparatus 115 may load an image from the external image capturing device 111 connected via the interface (IF 108). The information processing apparatus 115 also includes the wireless LAN I/F 109 to be connected to a wireless LAN (Local Area Network). The LAN is connected to the Internet 113. The information processing apparatus 115 can also acquire image data from an external server 114 connected to the Internet 113.

Finally, a printer 112 for outputting an image or the like is connected to the information processing apparatus 115 via the IF 107. Note that the printer 112 is also connected to the Internet 113 so that print data can be transmitted/received via the wireless LAN I/F 109.

Figure 2:
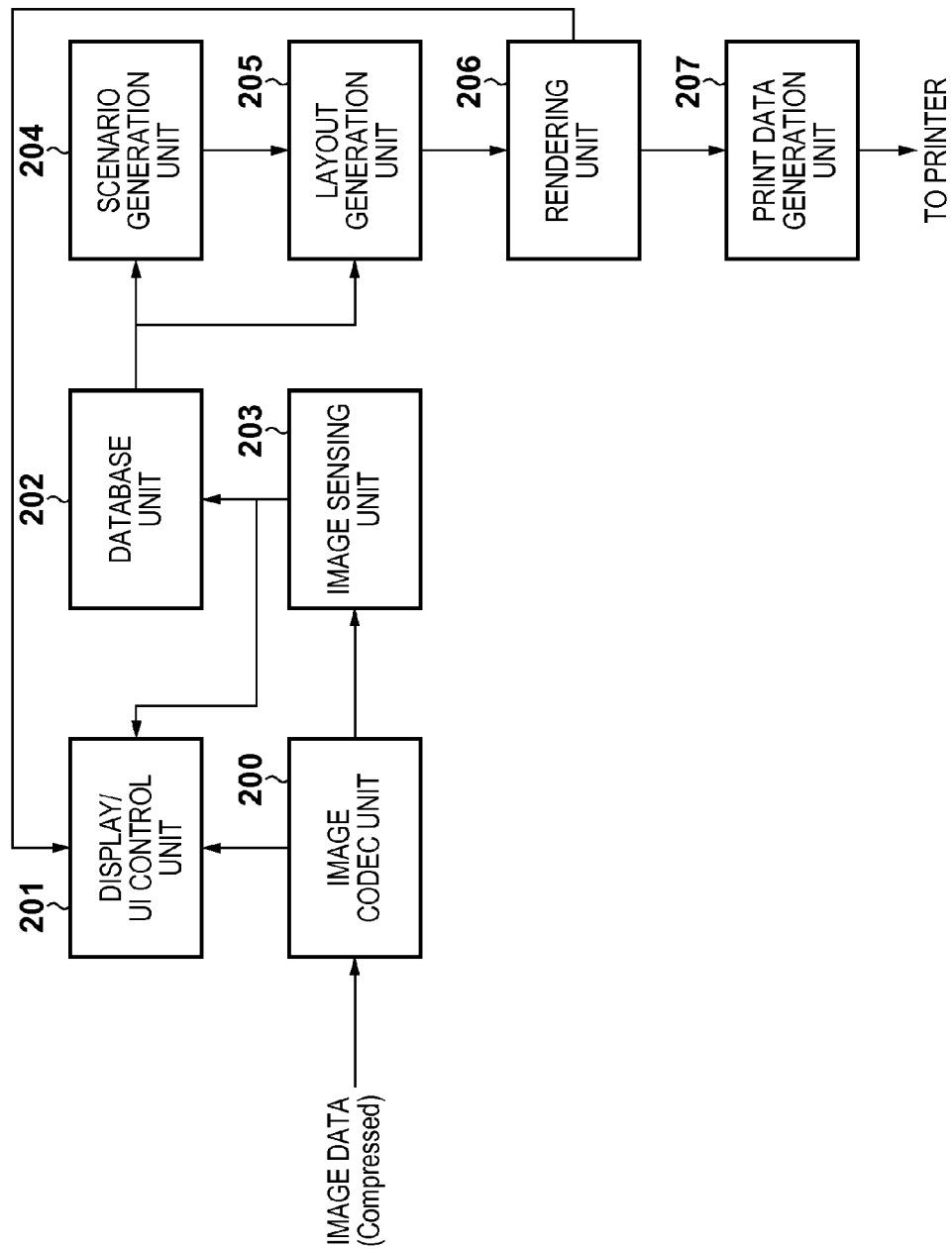
FIG. 2 is a block diagram showing a software configuration of processing of the present invention.

FIG. 2 is a block diagram of a basic software configuration including an application according to this embodiment.

Image data acquired by the information processing apparatus 115 normally has a compression format such as JPEG (Joint Photography Expert Group). Hence, an image codec unit 200 decompresses the compression format and converts it into a so-called RGB dot-sequential bitmap data format. The converted bitmap data is sent to a display/UI control unit 201 and displayed on the display device 104 such as a display.

The bitmap data is also input to an image sensing unit 203 (application). The image sensing unit 203 performs various kinds of analysis processing of the image (details to be described later). Various kinds of attribute information of the image obtained by the analysis processing are saved in the above-described secondary storage device 103 by a database unit 202 (application) in accordance with a predetermined format. Note that image analysis processing and sensing processing will be handled in the same sense hereinafter.

A scenario generation unit 204 (application) generates conditions of a layout to be automatically generated in accordance with various conditions input by the user (details will be described later). A layout generation unit 205 performs processing of automatically generating a layout in accordance with the scenario generated by the scenario generation unit 204.

A rendering unit 206 generates the display bitmap data of the layout generated by the layout generation unit 205. The bitmap data is sent to the display/UI control unit 201, and the result is displayed on the display device 104.

The rendering result by the rendering unit 206 is also sent to a print data generation unit 207. The print data generation unit 207 converts the bitmap data into printer command data and sends it to the printer 112.

The flowchart of basic image processing according to this embodiment will be described.

Figure 28:
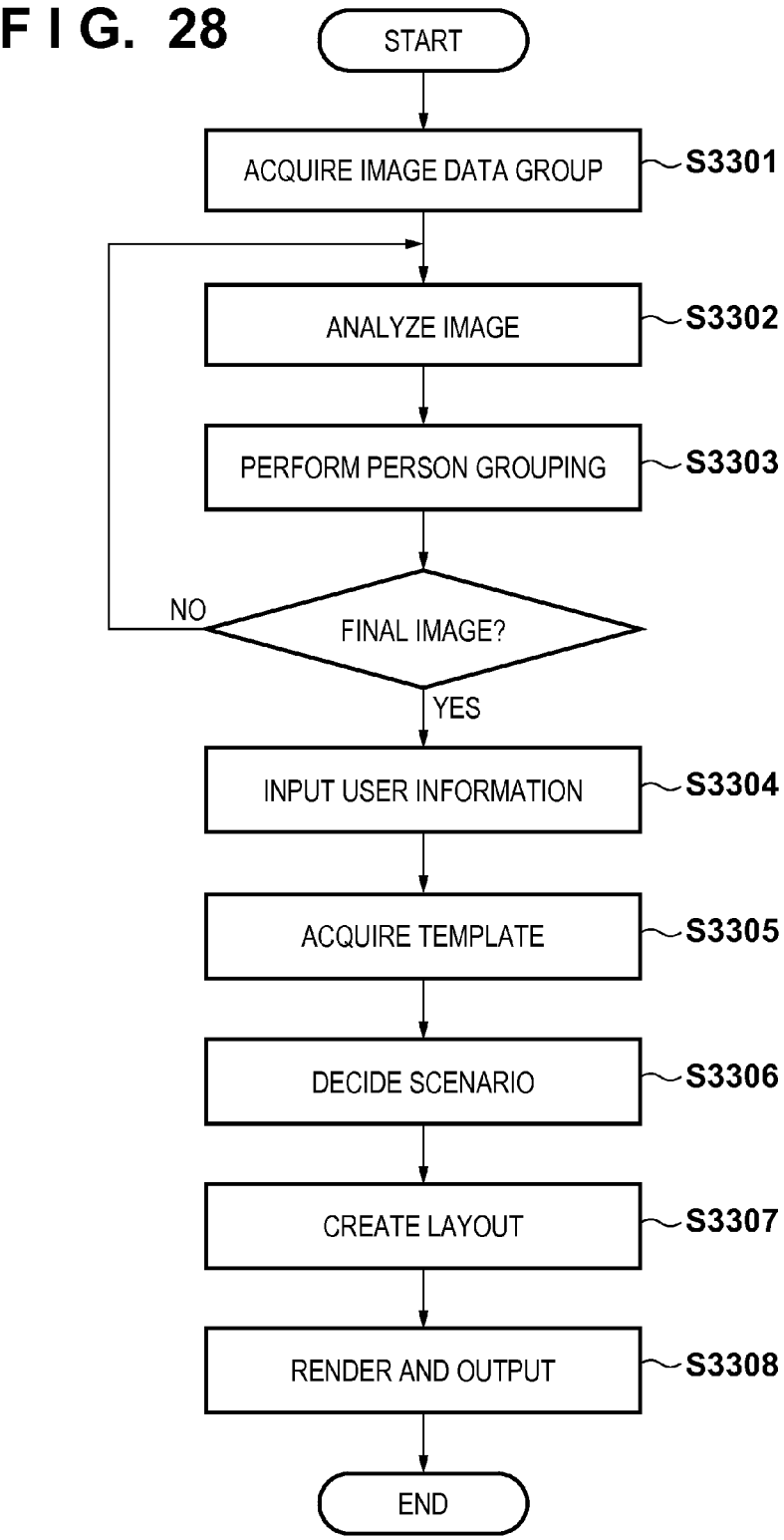
FIG. 28 is an overall flowchart of the first embodiment.

FIG. 28 is a flowchart illustrating the procedure of processing according to this embodiment. In this embodiment, the processing procedure is implemented by causing the CPU 100 to execute programs stored in the ROM 101 or the like.

In step S3301, the CPU 100 acquires an image data group. In this case, for example, image data captured by the user in the past using the external image capturing device 111 and saved in the secondary storage device 103 is obtained as a target, and the file path is acquired. Details of this method will be described later.

In step S3302, the CPU 100 decodes each image of the acquired image data group and performs analysis processing and analysis result database registration. In the analysis processing, the number of person's faces in the image, the coordinate positions of each of the faces, scene information, and the like are acquired and stored in the database. Details of this method will be described later.

In step S3303, the CPU 100 performs person grouping. Using the information of the faces detected in step S3302, faces having similar feature amounts are put into a group. Details of this method will be described later.

To perform the analysis (step S3302) and the grouping (step S3303) for all images, the CPU 100 repeats steps S3302 and S3303 as many times as the number of images.

In step S3304, the CPU 100 inputs user information. For each face grouped in step S3303, the user inputs a person name, a family relationship, and an attribute such as friend or family using a UI. This will be called person registration. For each face in each group, the coordinates of the face and the image in which the face exists are recorded. This allows the software to obtain information on who is located at which position of an image. Input of the user's favorite rating for each image and the like are also performed here. Details of this method will be described later.

Figure 15:
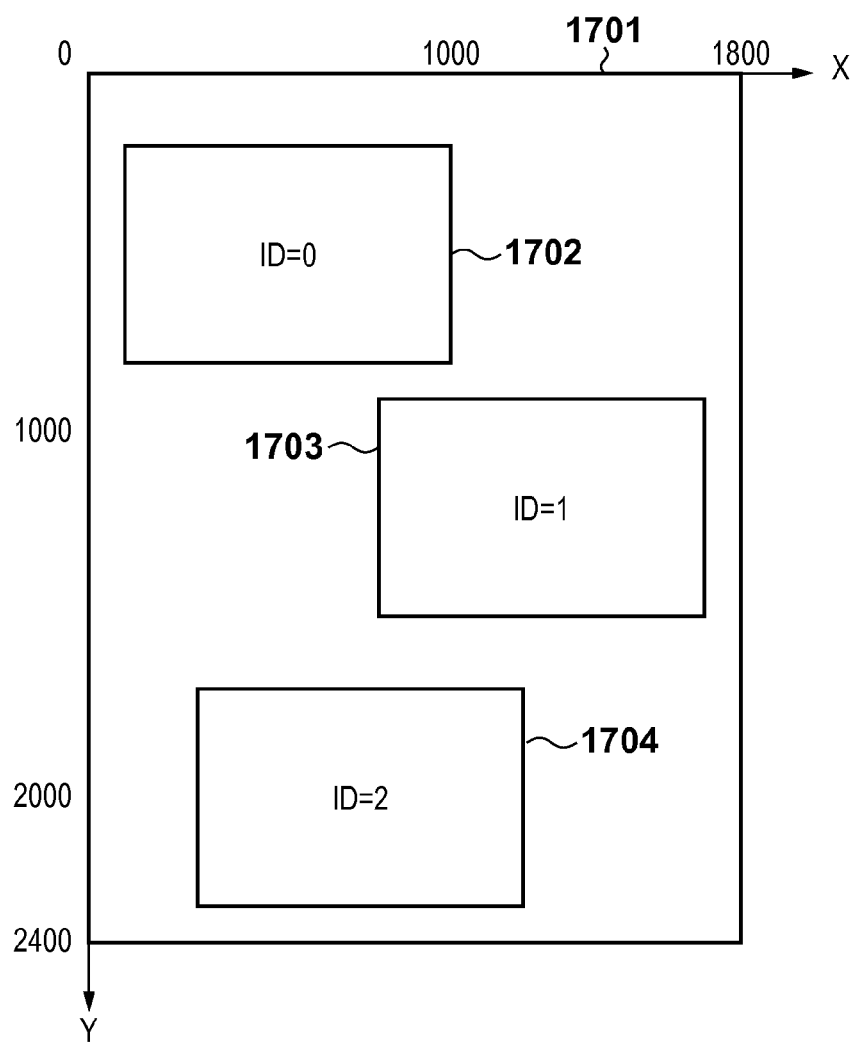
FIG. 15 is a view showing an example of a layout template.

In step S3305, the CPU 100 acquires a template. In this embodiment, various layout templates are assumed to be prepared in advance. Examples of the layout templates are shown in FIGS. 15, 17, and 31.

Note that reference numerals 1702, 1703, 1704, 1903, 3602, and 3603 in these drawings denote image arrangement regions to arrange images, which are called slots in the templates. Each slot has a predetermined size. In FIG. 31, the slots 3602 and 3603 overlap each other. Out of the overlapping slots, the slot 3603 on the lower side of the overlap has the hatched portion as the image arrangement region. Details of the templates will be described later.

In step S3306, the CPU 100 decides the scenario of proposal processing. The scenario includes the theme of the layout to be proposed, the decision of a template selection, settings of a person (main character) to be emphasized in the layout, and selection information of an image group to be used for layout generation. Note that the user may manually select and designate the scenario using a UI. Details of this method will be described later.

In step S3307, the CPU 100 performs image selection, temporary layout generation, and layout evaluation based on the above-described scenario. In the image selection, the luminance and the like are evaluated, and filtering is performed to exclude unnecessary images. Candidate images to be used in a temporary layout are thus selected. Details of the selection method will be described later.

In the temporary layout generation, processing of arbitrarily applying the images that have undergone the filtering above to the image arrangement frames of the acquired template is repeated to generate an enormous number of temporary layouts. In this case, layouts in which trimmed images are arranged in the slots are output. Details of the temporary layout generation will be described later.

In the layout evaluation, each of the enormous number of temporary layouts generated above is evaluated. In the evaluation, the individual evaluation value of each image, the matching between an image and a slot, the balance in each layout page, and the like are calculated and integrated to obtain an evaluation value.

In this embodiment, a cutoff of a region of interest, which is one of the evaluation items of the matching between an image and a slot, is evaluated. "Cutoff" indicates a state in which an object region included in the region of interest is divided into the inside and outside of the region to be displayed. When such division takes place, the region of interest is partially displayed and partially not displayed. That is, the region of interest is displayed while partially disappearing. The region of interest is, for example, the region of a face detected by sensing processing. A portion under the face can be estimated to be a body based on the coordinates, orientation, and size of the face. Hence, the region of interest may also include the estimated body portion. A face that is large to some extent, a person registered by the user, a person whose person attribute is family or friend, a person at the same distance as a person registered by the user, a place in focus, or the like may be set as the region of interest.

If an image includes a plurality of regions of interest, each region is handled as a candidate of the region of interest to be included in the region to be displayed. Note that in this specification, the plurality of regions of interest will also be expressed as a first candidate and a second candidate for descriptive convenience.

The distance is obtained by a method for determining an equidistance from parts whose parallactic distances match in a twin-lens camera. Alternatively, in a camera capable of shooting a plurality of focus positions by one shooting process, objects that are in focus at the same focal position are obtained as equidistant objects. With the above-described processing, once sensing or person registration is performed, the region of interest can automatically be determined. A region designated by the user using a UI, such as a mouse or a keyboard, may be set as the region of interest. The region of interest is not limited to a person and may be an object at rest such as a car, a building, or a mountain or an animal.

Figure 29:
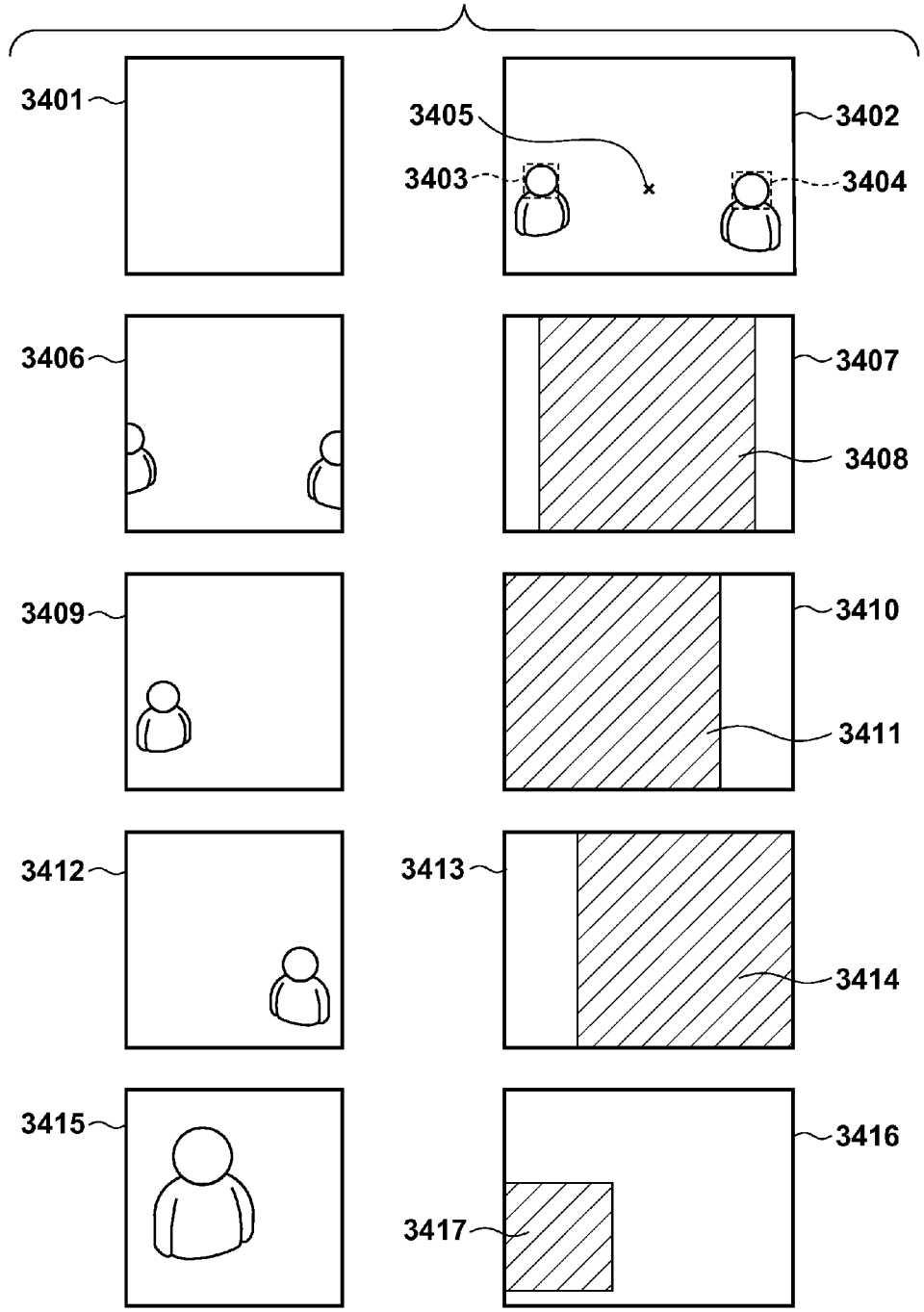
FIG. 29 is a view showing an example of automatic trimming processing.

Reference numeral 3401 in FIG. 29 represents the slot 1704 in FIG. 15. As described above, the slot is a region to arrange an image. Reference numeral 3402 denotes an image to be arranged in this slot. The image 3402 includes a region 3403 of interest (inside the broken line portion) and a region 3404 of interest (inside the broken line portion). The regions 3403 and 3404 of interest are face regions obtained by performing face detection processing and belonging to persons registered by the user. Reference numeral 3405 represents a center point of all regions of interest in the image, that is, the center point between the regions 3403 and 3404 of interest.

Reference numerals 3407, 3410, 3413, and 3416 represent coordinates of the image 3402. The hatched portions indicate trimming regions 3408, 3411, 3414, and 3417. The trimming regions have the same aspect ratio as that of the slot 3401. If a trimming region has an aspect ratio different from that of the slot, margins issue in the slot after image arrangement, and the image may look poor for the user.

The region 3408 trims the image such that the center point 3405 of the regions 3403 and 3404 of interest is located at the center. When the image 3402 is trimmed by the region 3408 in 3407, an image as indicated by 3406 is obtained. That is, reference numeral 3406 represents an output target region (output region) out of the image 3402 when the image 3402 is arranged in the template. Note that the output target region is the region to be visualized by output processing such as display or printing.

In 3406, a cutoff issues in each of the regions 3403 and 3404 of interest that are person's face portions. If an image is trimmed with a cutoff in the region of interest, only part of the region of interest is output. In this embodiment, in such a case, the value of cutoff evaluation (to be referred to as a cutoff evaluation value hereinafter) of the region of interest is set low, thereby controlling the process not to output the layout including the cutoff in the region of interest. The cutoff evaluation value is obtained in, for example, the following way.

FIG. 32 is a graph showing an example of a cutoff evaluation value with respect to a display area ratio, which can be implemented by a function or a lookup table. The cutoff evaluation value is a numerical value that exhibits a high evaluation value when no cutoff issues. The value is obtained for each region of interest, and the calculated values are integrated then. The cutoff evaluation value is calculated using the ratio of the area (to be referred to as a display area ratio hereinafter) where the region of interest is displayed after trimming. As for the display area ratio, for example, if the image 3402 is trimmed as indicated by 3406, 60% of the region 3403 of interest is displayed in 3406, whereas 40% disappears and is not displayed. In this case, the display area ratio is 60%. Note that in 3407 and 3408 representing the trimming positions of the image 3402, the display area ratio is obtained by counting the number of pixels overlapping in the trimming region 3408 and the region 3403 of interest and dividing the result by the number of pixels of the region 3403 of interest. When the region of interest and the trimming region are rectangular, the numerical value may be calculated using the coordinates to obtain the display area ratio.

Referring to FIG. 32, the area of the region 3403 of interest is defined as 100%. The ratio of the region displayed in 3406 out of the region of interest is plotted along the abscissa, and the cutoff evaluation value of the region of interest at that time is plotted along the ordinate. When the ratio of the display area is close to 100 [%], no cutoff issues in the region of interest, and the cutoff evaluation value is high, as shown in FIG. 32. As the ratio of the display area decreases, a cutoff issues in the region of interest, and the cutoff evaluation value lowers. The cutoff evaluation value becomes 0 when the display area falls below a certain value. On the other hand, when the ratio of the display area is close to 0%, the cutoff evaluation value is high. This is because no cutoff issues when the region of interest is not displayed at all.

When the display area ratio shown in FIG. 32 is close to 0% or 100%, the region of interest is not displayed, or the region of interest is wholly displayed. That is, the partial cutoff of the region of interest is unnoticeable, as can be seen. On the other hand, when the display area ratio is close to 50%, the partial cutoff of the region of interest is noticeable. In this embodiment, to prevent an image from being output while having a noticeable cutoff in the region of interest, setting is done to make the cutoff evaluation value high when the display area ratio is close to 0% to 100%.

The cutoff evaluation value is implemented on software by using a one-dimensional lookup table having an input/output characteristic as shown in FIG. 32 and including the display area ratio as an input and the cutoff evaluation value as an output.

In the above explanation, the cutoff evaluation value is changed in accordance with the display area ratio. As another example, a simple method of setting cutoff evaluation to 0 in case of issuance of even a little cutoff may be adopted.

Image 3406 obtained by trimming the image 3402 as indicated by trimming positions 3407 and 3408 is evaluated in the following manner. The area of the portion 3403 displayed in image 3406 is about 60 [%]. The cutoff evaluation value corresponding to the display area ratio of 60% is obtained as 0 by checking the graph shown in FIG. 32. Similarly, the portion 3404 also has a display area ratio of 60 [%], and the cutoff evaluation value is 0. To integrate the cutoff evaluation values of the plurality of regions of interest, the worst value out of them is obtained. That is, the minimum value is obtained as the cutoff evaluation value for the slot, the image, and the trimming position. Hence, the cutoff evaluation value of image 3406 that is the combination of the slot 3401, the image 3402, and the trimming position indicated by reference numerals 3407 and 3408 is 0.

Additionally, for example, each of the regions 3403 and 3404 of interest which are the person's face portions in the image 3402 is defined as an important portion of interest. The body portion of each person is estimated based on the face size and orientation and the like, and the body portion is defined as a quasi-portion of interest. The display ratio of the important portion of interest and that of the quasi-portion of interest are calculated. When only the quasi-portion of interest is cut off, the evaluation value is not lowered. When the important portion of interest is cut off, the cutoff evaluation value is lowered. More satisfactory evaluation can be performed by providing a mechanism that most lowers the evaluation value when the important portion of interest is not displayed, and only the quasi-portion of interest is displayed. This is because when not the face but the body is displayed, the trimming impresses the user particularly unfavorably.

When the image 3402 is trimmed using the region 3411 in 3410, image 3409 is obtained. In image 3409, although the person of the region 3404 of interest disappears, no cutoff issues in either of the regions 3403 and 3404 of interest. In this case, the cutoff evaluation value of each region of interest is set high. When checking the graph shown in FIG. 32, the cutoff evaluation value of the region 3403 of interest is 100 because the display area ratio is 100 [%], and the cutoff evaluation value of the region 3404 of interest is 100 because the display area ratio is 0 [%]. The worst value of these cutoff evaluation values is 100. This is the cutoff evaluation value of 3409 that is the combination of the slot 3401, the image 3402, and the trimming position indicated by 3410 and 3411. 3411 is obtained by moving the trimming position from 3408. As indicated by the evaluation value, when comparing image 3406 and image 3409, image 3409, in which the person's face is not cut off consequently, looks fine.

Similarly, when the image 3402 is trimmed using the region 3414 in 3413, image 3412 is obtained. Trimming region 3414 is obtained by moving the trimming position from trimming region 3408.

In image 3412, although the person of the region 3403 of interest disappears, no cutoff issues in either of the regions 3403 and 3404 of interest. Hence, the cutoff evaluation values are 100. When comparing images 3406 and 3412, image 3412, in which the person's face is not cut off, consequently looks fine.

Similarly, when the image 3402 is trimmed using the region 3417 in trimming region 3416, image 3415 is obtained. Since no cutoff issues in image 3415, the cutoff evaluation value is 100. When comparing images 3406 and 3415, image 3415, in which the person's face is not cut off, consequently looks fine.

That is, in the example shown in FIG. 29, the cutoff evaluation value is higher when one region of interest is wholly included in the arrangement frame, and the other region of interest is placed off the arrangement frame than when both the two regions of interest are partially placed off the arrangement frame having a predetermined size.

This processing will be described next with reference to FIG. 30.

Reference numeral 3501 represents the slot 1704 in FIGS. 15; and reference numeral 3502 denotes an image as a candidate to be arranged in this slot. The image 3502 includes regions 3503 to 3507 of interest (inside the broken lines). The regions 3503 to 3507 of interest are face regions obtained by performing face detection/recognition processing in sensing and belonging to persons registered by the user.

Reference numerals 3509, 3512, and 3515 denote figures representing the coordinates of the image 3502. Hatched portions 3510, 3513, and 3516 indicate trimming regions.

3510 in figure 3509 indicates a trimming region that trims the image such that the center of all the regions 3503 to 3507 of interest is located at the center of the slot 3501. It is consequently impossible to fit all the regions of interest in the same aspect ratio as that of the slot 3501 without margins. In addition, each of the regions 3503 and 3507 of interest is displayed only about 50 [%], and a cutoff issues. For this reason, the results of this trimming operation gives unfavorable impression. According to the graph shown in FIG. 32, the cutoff evaluation value corresponding to the display area ratio of 50 [%] is 0.

When the image 3502 is trimmed using the region 3513 in 3512, image 3511 is obtained. In image 3511, although the person of the region 3503 of interest disappears, no cutoff issues in either of the regions of interest. The cutoff evaluation value is obtained as 100 using the graph shown in FIG. 32 because the display area ratio is 0 [%]. When comparing images 3508 and 3511, image 3511, in which the person's faces are not cut off, consequently looks fine.

Similarly, when the image 3502 is trimmed using the region 3516 in figure 3515, image 3514 is obtained. In image 3514, although the persons of the regions 3503 and 3504 of interest disappear, no cutoff issues in either of the regions of interest. The cutoff evaluation values are obtained as 100 using the graph shown in FIG. 32. When comparing images 3508 and 3514, image 3514, in which the person's faces and the like are not cut off, consequently looks fine.

Figure 30:
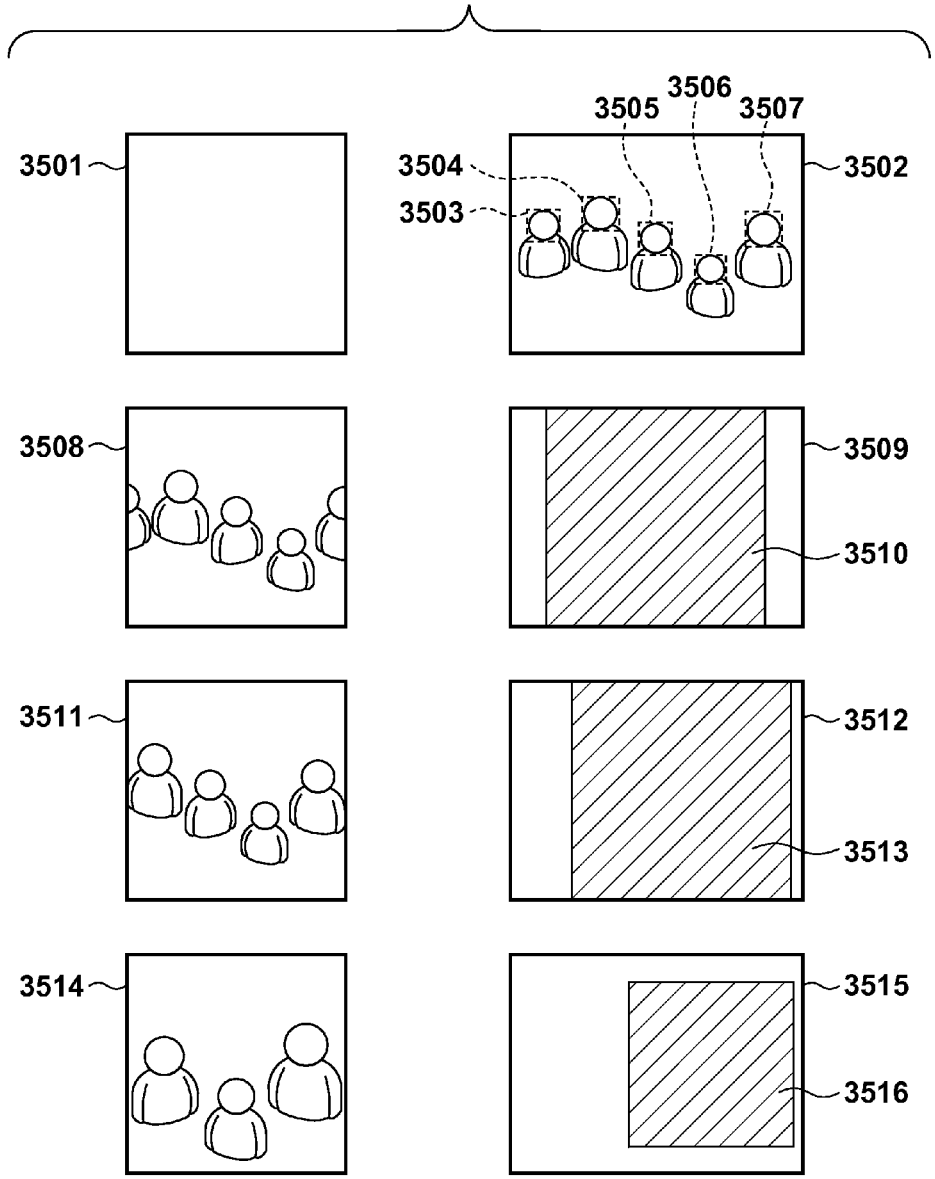
FIG. 30 is a view showing an example of automatic trimming processing.

In the examples shown in FIGS. 29 and 30 described above, the evaluation value is higher when a region of interest in an image is wholly placed off the output target region than when the region of interest is only partially included in the output target region and partially placed off the output target region. This can prevent the image from being output while having a cutoff in the region of interest.

Figure 33:
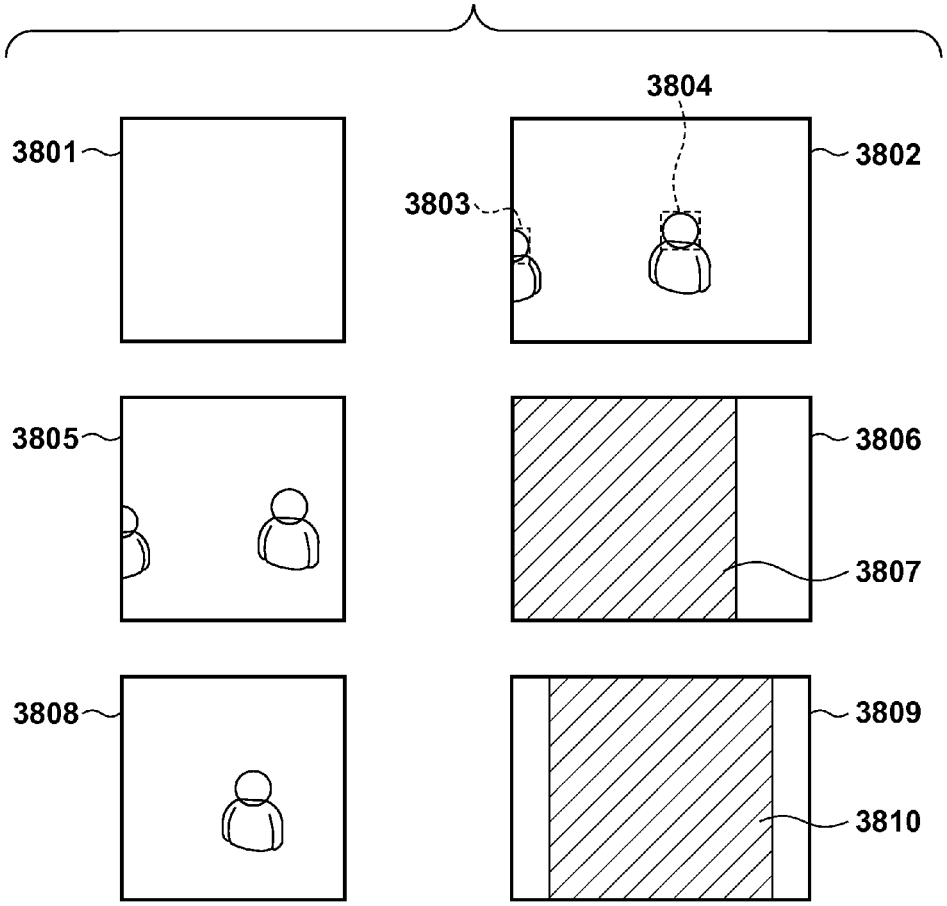
FIG. 33 is a view showing an example of automatic trimming processing.

This processing will be described next with reference to FIG. 33.

Reference numeral 3801 represents the slot 1704 in FIGS. 15; and reference numeral 3802 denotes an image as a candidate to be arranged in this slot. The image 3802 includes regions 3803 and 3804 of interest (inside the broken lines). The regions 3803 and 3804 of interest are face regions obtained by performing face detection/recognition processing in sensing and belonging to persons registered by the user. Note that the image 3802 includes the region 3803 of interest in which a face cutoff has issued at the time of shooting. Determining whether a face cutoff has issued in a shot image can be implemented by a method of, for example, performing face cutoff determination upon face detection or recognition processing or causing the user to designate a face cutoff image. Note that when performing face cutoff determination in face detection, a cutoff can be estimated based on the criterion of an item representing that a face included in an image is devoid of a face organ such as an eye or a nose or that a face exists at an edge of the image.

Reference numerals 3806 and 3809 represent coordinates of the image 3802. Hatched portions 3807 and 3810 indicate trimming regions. When the image 3802 is trimmed using the region 3807 in 3806, image 3805 is obtained. In image 3805, the image is displayed, including the region 3803 of interest in which a cutoff issues, as described above. In this case, if the region 3803 of interest is displayed even a little, the evaluation value of cutoff determination is 0. As another example, the area of the region 3803 of interest, when the face is wholly included, is estimated. The cutoff determination evaluation value may be obtained using a function like the graph shown in FIG. 32 based on the estimated area and the area displayed in 3805.

When the image 3802 is trimmed using the region 3810 in 3809, image 3808 is obtained. In image 3808, no cutoff issues in the region of interest. For this reason, the cutoff evaluation value is 100. The image looks finer in 3808 having the high cutoff evaluation value than in image 3805.

Note that FIGS. 29 and 30 show examples in which a plurality of regions of interest are partially cut off by trimming processing for arranging an image in an arrangement frame having a predetermined size. On the other hand, in the example shown in FIG. 33, the image includes a cutoff in the region of interest from the beginning. Hence, cutoff evaluation may be performed while changing the evaluation criterion between the case in which a cutoff issues in a region of interest upon trimming processing and the case in which an image includes a cutoff from the beginning.

For example, when an image includes a cutoff from the beginning, the person who has shot the image may have not recognized the cutoff region as a region of interest. For example, a case can be assumed in which when shooting is performed such that a main person is arranged at the center of the image, the face of a person who is not the main person is placed off the image. In this case, even when the region of interest (face) is partially cut off, the image may be desirable for the user. For this reason, if the image includes a cutoff in the region of interest from the beginning, the cutoff determination may be prohibited for the region of interest. Alternatively, the evaluation criterion may be set such that the cutoff evaluation value exceeds a predetermined value (for example, 50) for the region of interest.

In step S3307 of FIG. 28, the evaluation values of the respective categories other than the cutoff evaluation value are obtained for the layout and integrated by weighted summing to obtain the evaluation value of the layout. Methods of outputting the other evaluation values will be described later.

In step S3308 of FIG. 28, rendering and output are performed.

The layout result obtained by the above-described processing is rendered, and the result is displayed on the display device 104. After the display, the user may correct the trimming position using the mouse or the like.

As described above, the evaluation value is higher in a state in which the region of interest completely disappears than in a state in which the region of interest partially disappears, and the evaluation value is preferentially employed. This makes it possible to prevent the image from being output while having a cutoff in the region of interest. In addition, since cutoff evaluation is performed for each region of interest, the evaluation can be performed even for an image including a plurality of regions of interest.

Note that in the above explanation, cutoff evaluation is performed using a detected face as a region of interest. However, if a cutoff has issued in the face of a person (family, friend, or acquaintance) registered in step S3304, the face cutoff is especially problematic. For this reason, cutoff evaluation may be done by applying a weight for each region of interest by, for example, lowering the cutoff evaluation value to 0 when a registered person's face is cut off and lowering the cutoff evaluation value to only 50 when an unregistered person' face is cut off.

At the time of cutoff evaluation, the number of regions of interest displayed inside a slot may be taken into consideration. For example, when trimming region is performed such that all regions of interest are located outside the slot, and no region of interest is displayed as all, the cutoff evaluation value is 100 in the above-described example because no cutoff issues. Hence, a process is inserted to, for example, determine whether at least one region of interest is displayed in the slot and, if no region of interest is displayed, set the cutoff evaluation value to 0. This can prevent such trimming that displays no region of interest in a slot at all.

If no region of interest of a registered person is displayed in a slot, the cutoff evaluation value may be set to 0. These processes need not always be performed at the time of cutoff evaluation and may be performed in another item such as person matching evaluation to be described later or provided as dedicated evaluation items. In addition, determining whether a plurality of regions of interest exist may be provided, and the processes may be performed when a plurality of regions of interest exist.

Details of each step according to this embodiment will be described below.

Figure 3:
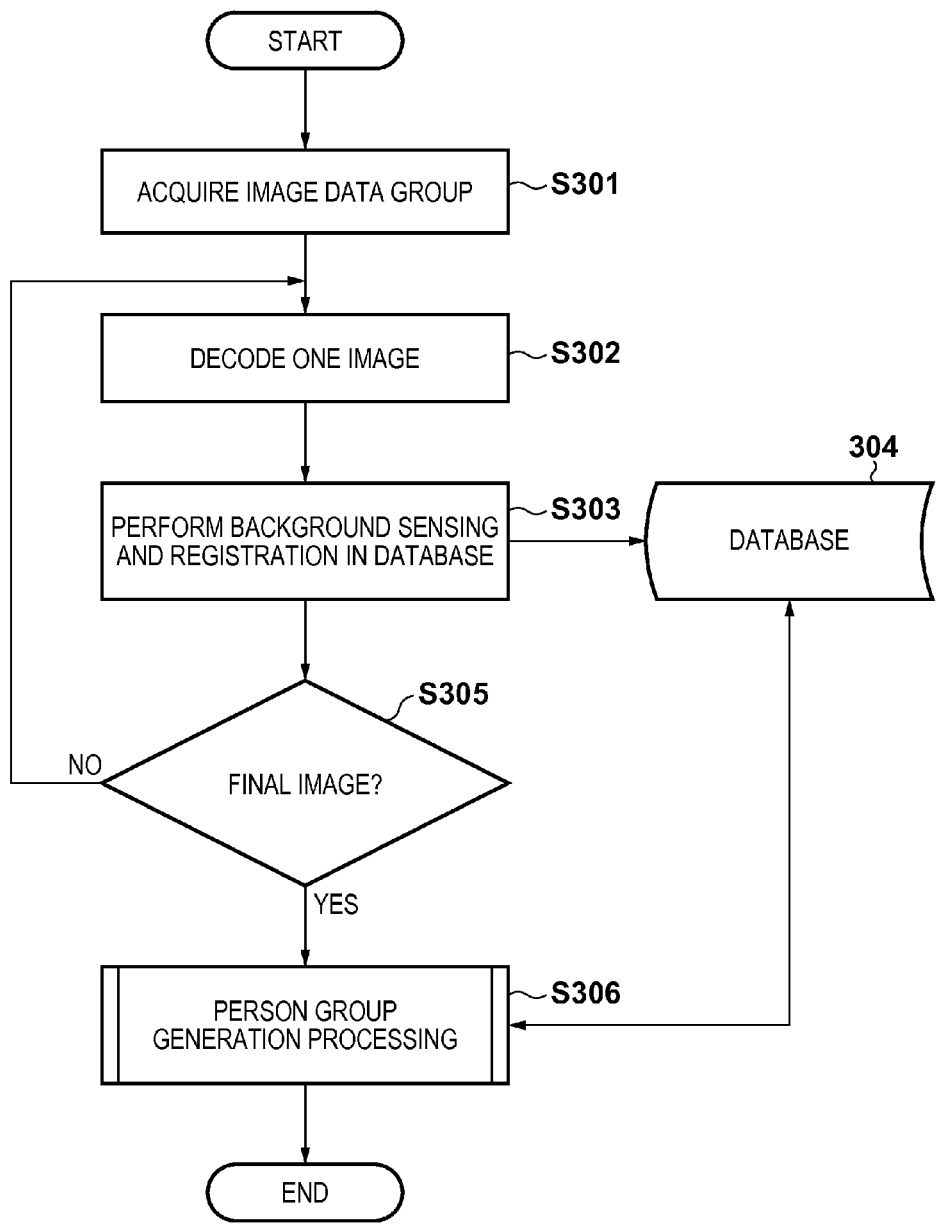
FIG. 3 is a flowchart of image analysis processing.
Figure 4:
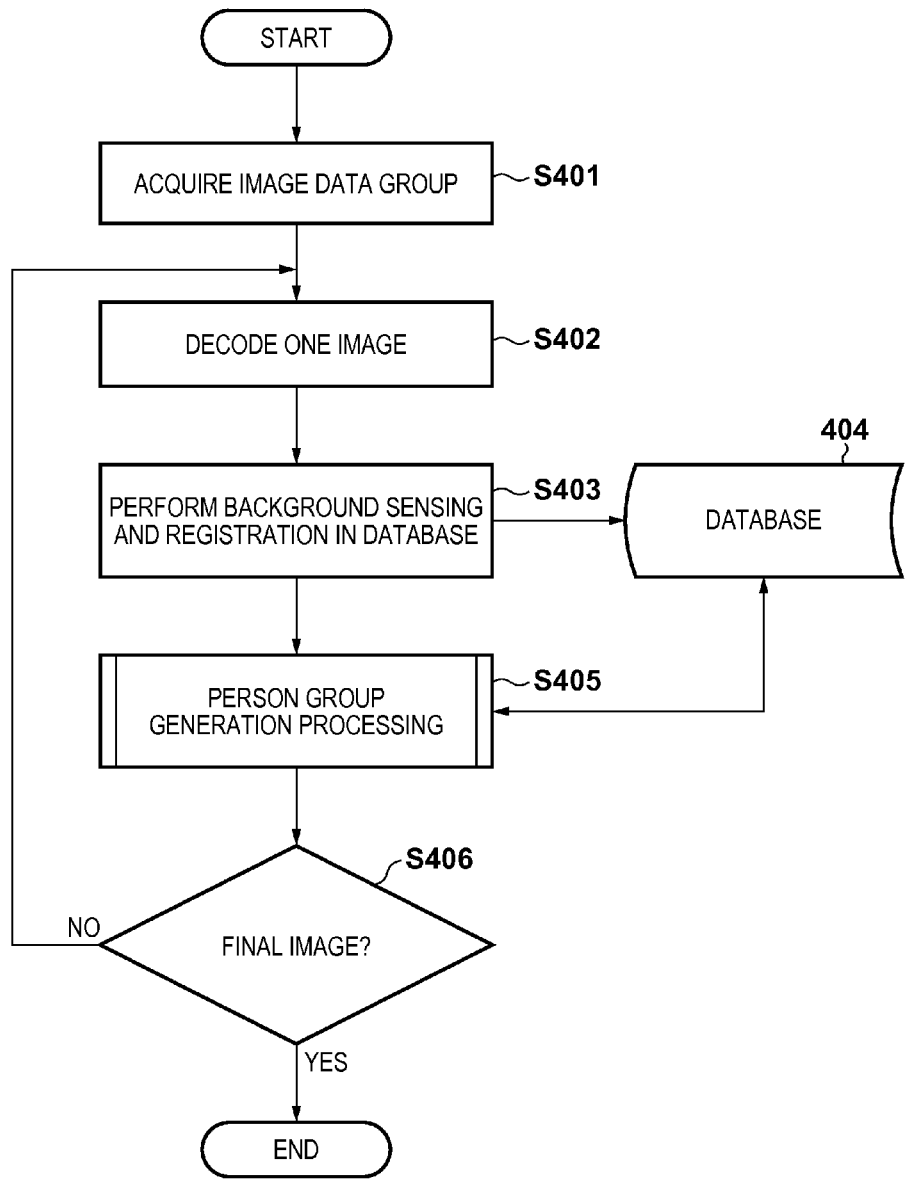
FIG. 4 is a flowchart of image analysis processing.

FIGS. 3 and 4 illustrate the procedure of the image sensing unit 203 or the procedure of acquiring a plurality of image data groups, performing analysis processing for each of them, and storing the result in the database. The processes shown in FIGS. 3 and 4 correspond to the processes of steps S3301 to S3303 in FIG. 28.

The flowchart of processing executed by the image sensing unit 203 will be described first with reference to FIG. 3.

In step S301, an image data group is acquired. To acquire the image data group, for example, the user connects an image capturing apparatus or memory card storing shot images to the information processing apparatus 115, thereby loading the captured images. Images shot by the internal image capturing device 106 and saved in the secondary storage device 103 are also included in the acquisition target, as a matter of course. Alternatively, the images may be acquired from an apparatus other than the information processing apparatus 115, for example, the external server 114 connected to the Internet 113 via the wireless LAN I/F 109.

Figure 8:
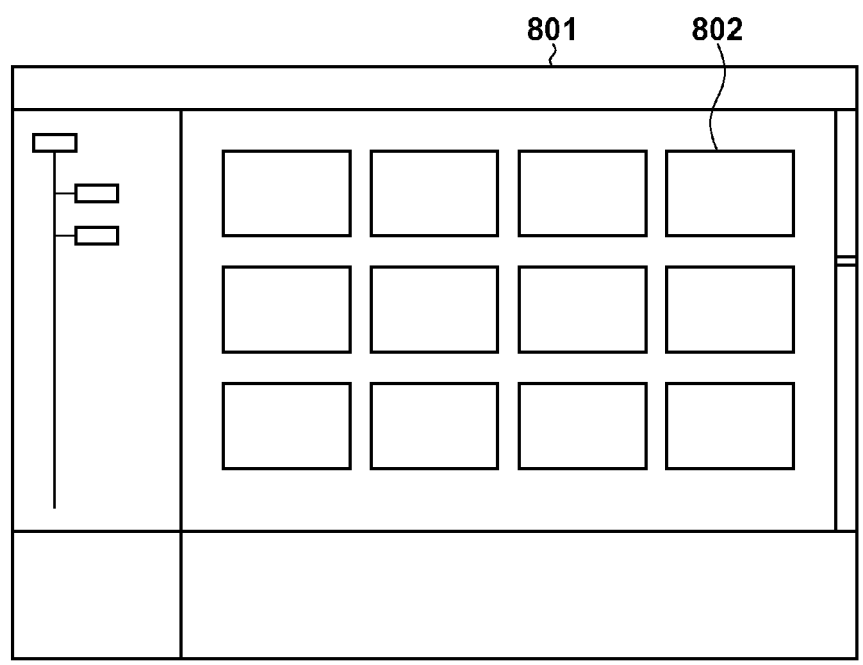
FIG. 8 is a view showing a display example of an image group in a thumbnail format.
Figure 9:
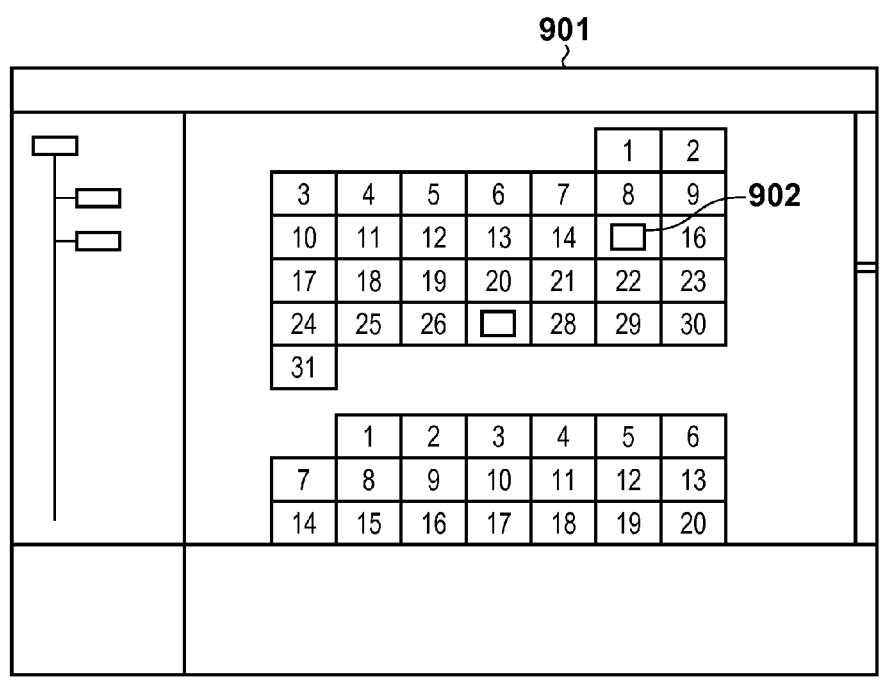
FIG. 9 is a view showing a display example of an image group in a calendar format.

Display of the display device 104 at the time of image data group acquisition will be described here with reference to FIGS. 8 and 9. When an image data group is acquired, a UI on the display device 104 displays a thumbnail group corresponding to the image data group so that the user can confirm the images based on the acquired image data, as shown in FIG. 8 or 9. The display method of the UI on the display device 104 is not particularly limited as long as the images can be confirmed. For example, a UI 801 may display thumbnails 802 of the images for each folder in the secondary storage device 103, as shown in FIG. 8. Alternatively, the image data may be managed for each date on a UI 901 using a calendar format, as shown in FIG. 9. When the user clicks on a date portion 902 in the UI 901 shown in FIG. 9, images shot that day are displayed in a thumbnail list, as in the UI 801 shown in FIG. 8.

In steps S302 to S305 of the flowchart shown in FIG. 3, analysis processing and analysis result database registration are performed for each acquired image data group.

More specifically, in step S302, each image is decoded. First, the image sensing unit 203 (application) searches for an image newly saved and yet to undergo sensing processing. The codec unit converts each extracted image from compressed data to bitmap data.

In step S303, various kinds of sensing processing are executed for the converted bitmap data to acquire sensing information, and the sensing information is registered in the database. Table 1 shows an example of attribute information obtained by image analysis. The sensing processing is assumed to include various kinds of processing as shown in Table 1. In this embodiment, face detection, face region feature amount analysis, image feature amount analysis, and scene analysis are performed as examples of the sensing processing, and results of data types as shown in Table 1 are calculated. In this embodiment, average luminance (int: value 0 to 255), average saturation (int: value 0 to 255), and average hue (int: value 0 to 359) are analyzed as the basic image feature amounts. In addition, the number of person's faces (int: value 0 or more (0 to MAXFACE)) and coordinate positions (int*8: value 0 or more (0 to Width or Height)) representing the position information of each person's face are analyzed as face detection. Furthermore, the average Y (int: value 0 to 255) in a face region, the average Cb (int: value −128 to 127) in a face region, and the average Cr (int: value −128 to 127) in a face region are analyzed.

TABLE 1

| Sensing classification | Sensing sub-classification | Data type | Value |
|---|---|---|---|
| basic image feature amount | average luminance | int | 0 to 255 |
| | average saturation | int | 0 to 255 |
| | average hue | int | 0 to 359 |
| face detection | number of person's faces | int | 0 to MAXFACE |
| | coordinate position | int*8 | 0 to Width or Height |
| | average Y in face region | int | 0 to 255 |
| | average Cb in face region | int | −128 to 127 |
| | average Cr in face region | int | −128 to 127 |
| scene analysis | scene result | char | Landscape Nightscape Portrait Underexposure Others |

Each sensing processing will be explained below.

The average luminance and the average saturation of an entire image, which are the basic image feature amounts, can be obtained by a known method and will therefore be described briefly. For the average luminance, the R, G, and B components of each pixel of the image are converted into known luminance and color difference components (for example, Y, Cb, and Cr components), and the average value of the Y components is obtained. For the average saturation, the Cb and Cr components are calculated for each pixel, and the average value of S is obtained by $$S=\sqrt{Cb^2+Cr^2}$$

The average hue (AveH) in an image is a feature amount to evaluate the tone of the image. The hue of each pixel can be obtained using a known HIS conversion formula. The values are averaged in the entire image, thereby obtaining AveH.

The feature amounts may be calculated for the entire image. Alternatively, for example, the image may be divided into regions having a predetermined size, and the feature amounts may be calculated for each region.

A person's face detection processing will be described next. Various methods are usable as the person's face detection method according to this embodiment. According to a method described in Japanese Patent Laid-Open No. 2002-183731, an eye region is detected from an input image, and a region around the eye region is set as a face candidate region.

The luminance gradient and the weight of the luminance gradient are calculated for the detected face candidate region. These values are compared with the gradient and the gradient weight of a preset ideal reference face image. At this time, when the average angle between the gradients is equal to or smaller than a predetermined threshold, the input image is determined to have a face region.

According to a method described in Japanese Patent Laid-Open No. 2003-30667, a flesh color region is detected from an image. A human iris color pixel is then detected in the flesh color region, thereby detecting the position of an eye.

According to a method described in Japanese Patent Laid-Open No. 8-63597, the level of matching between an image and each of a plurality of templates of face shapes is calculated. A template having the highest matching level is selected. If the highest matching level is equal to or more than a predetermined threshold, the region in the selected template is set as a face candidate region. Using this template makes it possible to detect the position of an eye.

According to a method described in Japanese Patent Laid-Open No. 2000-105829, an entire image or a designated region of an image is scanned using a nose image pattern as a template. A position that matches the template most is output as the position of the nose. Next, a region above the nose position in the image is assumed to be a region where the eyes exist. The eye existence region is scanned using an eye image pattern as a template, and matching is calculated. An eye existence candidate position set that is a set of pixels whose matching levels are higher than a threshold is obtained. In addition, a continuous region included in the eye existence candidate position set is divided into clusters. The distance between each cluster and the nose position is calculated. A cluster having the shortest distance is decided to be a cluster including an eye, thereby detecting the organ position.

As other face detection processing methods, for example, known methods of detecting a face and organ positions to be described below may be used. For example, Japanese Patent Laid-Open Nos. 8-77334, 2001-216515, 5-197793, 11-53525, 2000-132688, 2000-235648, and 11-250267 are usable. In addition, Japanese Patent No. 2541688 is usable.

As a result of the above-described processing, the number of human faces and the coordinate positions of each face can be acquired.

Once face coordinate positions in an image are known, the average luminance and the average color difference of the face region can be obtained by calculating, for each face region, the average Y, Cb, and Cr values of pixel values included in the face region.

Scene analysis processing can be performed using the feature amount of an image. For the scene analysis processing, a method disclosed in, for example, Japanese Patent Laid-Open No. 2010-251999 or 2010-273144 may be used. Note that a detailed description of these techniques will be omitted here. The scene analysis can acquire an ID to distinguish the shooting scene such as Landscape, Nightscape, Portrait, Underexposure, and Others.

Note that the sensing information is not limited to that acquired by the above-described sensing processing, and any other sensing information may be used.

The sensing information acquired in the above-described manner is saved in the database unit 202. The saving format in the database unit 202 is not particularly limited. The sensing information is described using, for example, a general-purpose format (for example, XML: eXtensible Markup Language) as shown in FIG. 10 and stored.

FIG. 10 shows an example in which the attribute information of each image is classified into three categories and described. The first BaseInfo tag is information added to an acquired image file in advance and representing the image size and shooting time information. This tag includes the identifier ID of each image, the save location where the image file is stored, the image size, and the shooting date/time.

The second SensInfo tag is used to store the result of the above-described image analysis processing. The average luminance, average saturation, and average hue of the entire image and the scene analysis result are stored. In addition, information associated with the face position and face color of each person existing in the image can be described.

The third UserInfo tag can store information input by the user for each image. Details will be described later.

Note that the method of storing image attribute information in the database is not limited to that described above, and any other known format is usable.

Next, in step S306 of FIG. 3, person grouping using personal recognition processing is performed. In this case, processing of generating a group for each person using the face position information detected in step S303 is performed. Automatically grouping person's faces in advance makes it possible to increase the efficiency of the user's operation of naming each person later.

Figure 5:
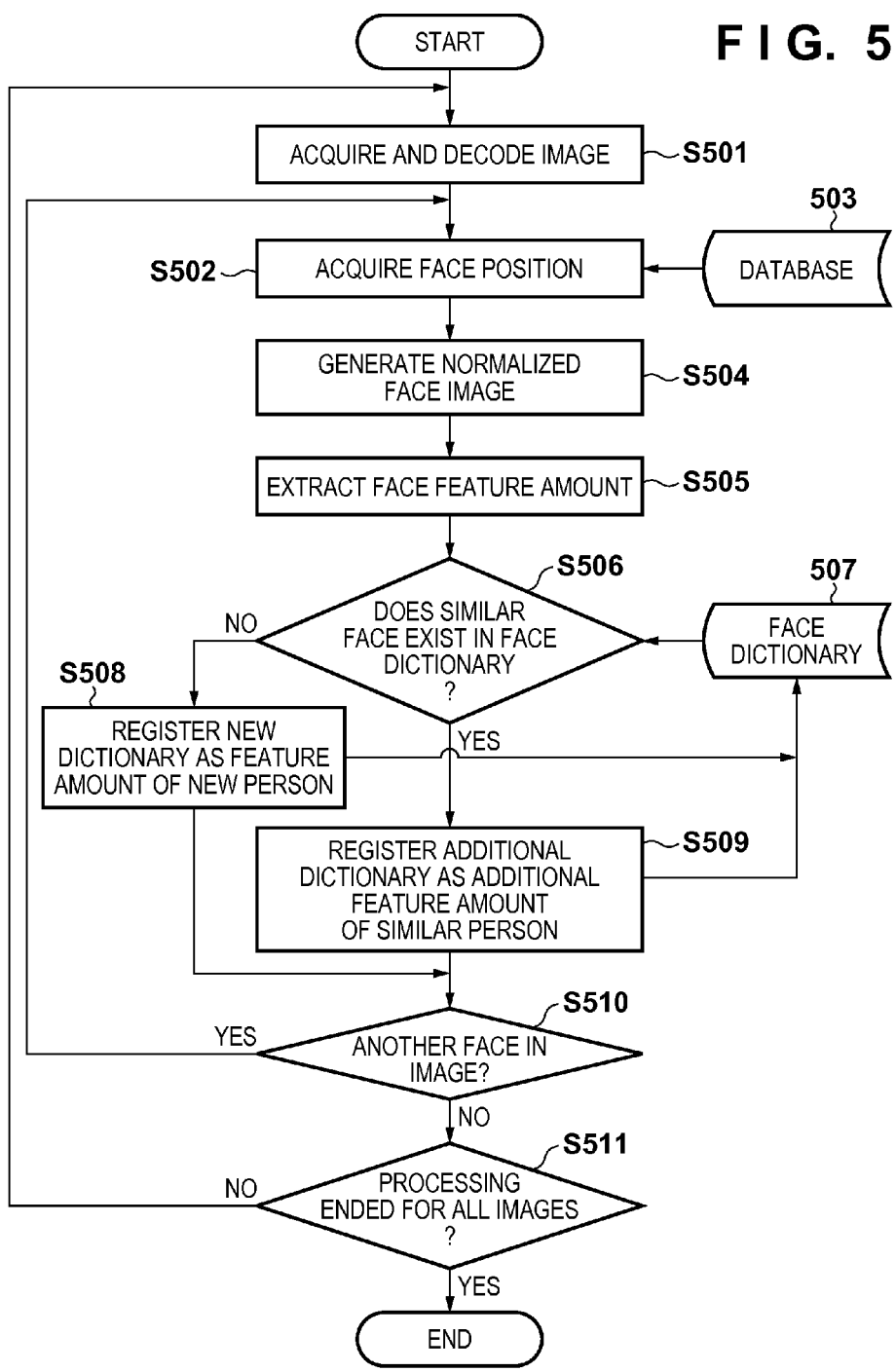
FIG. 5 is a flowchart of person group generation processing.

This person group generation processing is executed using a known personal recognition technique in accordance with a processing procedure shown in FIG. 5.

Note that the personal recognition technique mainly includes two techniques, that is, extracting the feature of an organ such as an eye or a mouth existing in a face and comparing the similarities of the relationships. As the technique, for example, a technique disclosed in Japanese Patent No. 3469031 can be used. Note that the above-described personal recognition technique is merely an example, and any method is usable in this embodiment.

FIG. 5 illustrates the procedure of processing of grouping face information supposed to be of the same person based on detected face position information. FIG. 5 is a flowchart corresponding to the person group generation processing (step S306 of FIG. 3 or step S405 of FIG. 4).

In step S501, the images saved in the secondary storage device 103 are sequentially read out and decoded. The decoding processing is the same as in step S302, and a description thereof will be omitted. In step S502, a database 503 is accessed, and the number of faces included in each image and the position information of each face are acquired. In step S504, normalized face images to be used for personal recognition processing are generated.

The normalized face images are face images obtained by extracting faces existing in the images with various sizes, orientations, and resolutions and converting them into faces having a predetermined size and orientation. Since the positions of organs such as an eye and a mouth are important in personal recognition, each normalized face image can have such a size that makes it possible to reliably recognize the above-described organs. When the normalized face images are prepared, it is unnecessary to cope with faces of various resolutions in the feature amount extraction processing.

In step S505, face feature amounts are extracted from the normalized face image. In this case, as a characteristic feature, the face feature amounts include the positions and sizes of organs such as an eye, mouth, and nose and the outline of the face.

In step S506, it is determined whether the face feature amounts are similar to face feature amounts in a database (to be referred to as a face dictionary 507 hereinafter) that stores face feature amounts prepared for each person identifier (ID) in advance. Note that details of the face dictionary will be described later. If the determination of step S506 ends with "YES", the face is determined to belong to the same person and added to the dictionary ID of that person in step S509.

If the determination of step S506 ends with "NO", the current evaluation target face is determined to belong to a person different from those registered in the face dictionary so far. Hence, a new person ID is issued, and the face is added to the face dictionary 507. In step S510, it is determined whether another face region exists in the processing target image data. If another face region exists (YES in step S510), the process returns to step S502. On the other hand, if no other face region exists (NO in step S510), the process advances to step S511.

In step S511, it is determined whether the processes of steps S502 to S509 have ended for all images. If the processes have ended for all images, the processing ends. If the processes have not ended for all images, the process returns to step S502. That is, the processes of steps S502 to S509 are applied to all face regions detected from the input image group, and the appearing persons are grouped.

The grouping result is described using an ID tag for each face region, as shown in the XML format of FIG. 14, and saved in the above-described database 304.

Note that in the above-described embodiment, the person group generation processing is executed after the sensing processing and database registration of all image data have ended, as shown in FIG. 3. However, this embodiment is not limited to this. For example, even when the sensing processing and the database registration of step S403 and the grouping processing of step S405 are repetitively performed for each image, as shown in FIG. 4, the same result can be generated.

Figure 7:
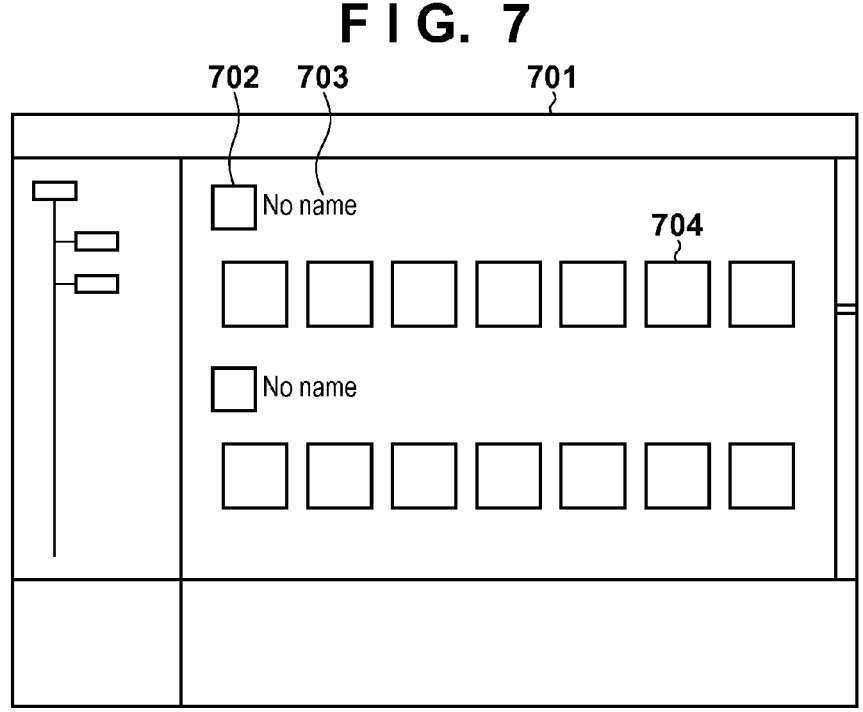
FIG. 7 is a view showing a display example of person groups.

Each person group obtained by the above-described processing is displayed on the UI of the display device 104. FIG. 7 shows the display of each person group according to this embodiment. On a UI 701 as shown in FIG. 7, reference numeral 702 denotes a representative face image of a person group. A region 703 to display the name of the person group exists on a side. Immediately after the automatic person grouping processing, "No name" is displayed as the person name, as shown in FIG. 7. Reference numeral 704 denotes a plurality of face images included in the person group. In the UI 701 shown in FIG. 7, the user can input a person name by designating the "No name" region 703 or can input information such as the birthday or family relationship for each person by operating the input device 105, as will be described later.

The sensing processing may be executed using the background task of the operating system. In this case, the user can continue the sensing processing of the image group even when another operation is being performed on the information processing apparatus 115.

In this embodiment, the user may be assumed to manually input various kinds of attribute information about an image. Alternatively, various kinds of attribute information about an image may be set automatically.

Table 2 shows a list of examples of attribute information. The manually or automatically registered attribute information is roughly divided into information set for each image and information set for each person grouped by the above-described processing.

TABLE 2

| Classification | Contents | Data type | Value |
|---|---|---|---|
| image | favorite rate | int | 0 to 5 |
| | event | char | "travel" "graduation" "wedding" |
| person | name | char | "NAME" |
| | birthday | char | YYYYMMDD |
| | family relationship | char | "family" |

Figure 11:
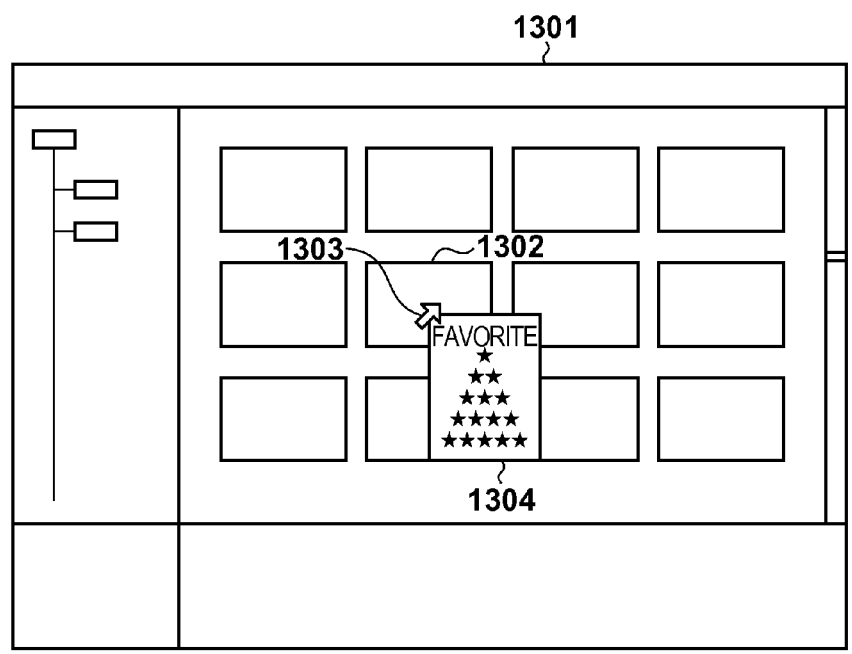
FIG. 11 is a view showing an example of a UI used to manually input the favorite rate.

An example of the information set for each image is the "favorite rate" of the user. The user can manually input, for example, the favorite rate representing whether the user likes the image. For example, as shown in FIG. 11, the user selects a desired thumbnail 1302 image on a UI 1301 by a mouse pointer 1303 and clicks the right bottom of the mouse, thereby displaying a dialogue capable of inputting the favorite rate. The user can select the number of ★ in the menu in accordance with his/her taste. In this embodiment, the setting is performed such that the higher the favorite rate is, the larger the number of ★.

The favorite rate may be set automatically, instead of causing the user to manually input this information. For example, the user's count of viewing may automatically be set as the favorite rate. Assume that the user clicks on a desired image file in the state shown in FIG. 8 in which the thumbnail image list is displayed to transit to a single image display screen. The transition count is measured, and the favorite rate is set in accordance with the measured count. That is, it is determined that the larger the viewing count, the more the user likes the image.

As another example, the favorite rate may automatically be set in accordance with the printing count. More specifically, for example, the number of times of print instruction issuance for an image by the user is measured as the printing count. It is determined that the larger the printing count, the higher the user's favorite rate of the image.

As described above, as for the favorite rate, the method of causing the user to manually set the favorite rate, the method of automatically setting the favorite rate based on the viewing count or printing count, and the like are usable. The above-described attribute information is individually stored in the UserInfo tag of the database unit 202 using the XML format as shown in FIG. 10. For example, the favorite rate is represented by a FavoriteRate tag, the viewing count is represented by a ViewingTimes tag, and the printing count is represented by a PrintingTimes tag.

Another attribute information set for each image is event information. Examples of the event information are "travel", "graduation", and "wedding".

Figure 12:
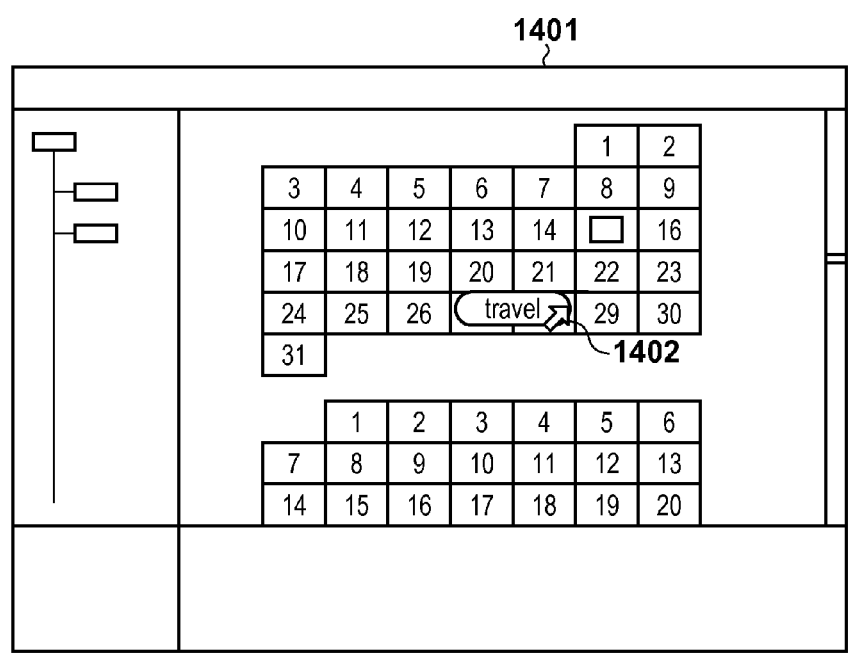
FIG. 12 is a view showing an example of a UI used to manually input event information.

To designate the event, for example, as shown in FIG. 12, a desired date may be designated on a calendar using a mouse pointer 1402 or the like, and the name of the event on that day may be input to set the event. The designated event name is included in the XML format shown in FIG. 10 as part of the image attribute information. In the format shown in FIG. 10, the event name and the image are associated (linked) with each other using an Event tag in the UserInfo tag.

Person attribute information will be described next with reference to FIG. 13.

FIG. 13 shows a UI used to input person attribute information. Referring to FIG. 13, reference numeral 1502 denotes a representative face image of a predetermined person (in this case, "father"). In addition, reference numeral 1504 denotes a list of images detected from other images and determined to have similar face feature amounts in step S506.

After the sensing processing, no name is input for each person group, as shown in FIG. 7. The user designates the "No name" region 703 using a mouse pointer. When the user inputs a person name by operating a keyboard or the like, the arbitrary person name can be input.

As an attribute of each person, the birthday of the person or the family relationship viewed from the user who is operating the application can also be set. In this embodiment, when clicking on the representative face 1502 of the person shown in FIG. 13, the user can input the birthday of the clicked person using a first input portion 1505 and the family relationship information using a second input portion 1506, as illustrated on the lower side of the screen.

Unlike the image attribute information linked with the images, the input person attribute information is managed in the database unit 202 separately from the image attribute information using the XML format as shown in FIG. 14.

In this embodiment, various layout templates are assumed to be prepared in advance. Examples of the layout templates are shown in FIGS. 15, 17, and 31. Each layout template includes a plurality of image arrangement frames 1702, 1703, 1704, 1902, 3602, and 3603 (to be synonymous with slots hereinafter) on a paper size to lay out images.

The templates are saved in the secondary storage device in advance when the software to execute the embodiment is installed in the information processing apparatus 115. As another method, an arbitrary template group may be acquired from the external server 114 existing on the Internet 113 connected via the IF 107 or the wireless LAN I/F 109.

These templates are assumed to be described in a highly versatile structured language, for example, XML like the above-described sensing result storage. FIGS. 16 and 18 show examples of XML data. In FIGS. 16 and 18, first, a BASIC tag describes the basic information of the layout page. Examples of the basic information are the theme of the layout, the page size, and the page resolution (dpi). Referring to FIGS. 16 and 18, a Theme tag representing the layout theme is blank in the initial state of the template. In this embodiment, as the basic information, the page size is set to A4, and the resolution is set to 300 dpi.

Subsequently, information of each of the above-described image arrangement frames is described by an ImageSlot tag. The ImageSlot tag holds two tags, that is, an ID tag and a POSITION tag to describe the ID and position of the image arrangement frame. The position information is defined on, for example, an X-Y coordinate system having its origin at the upper left corner, as shown in FIG. 15 or 17.

The ImageSlot tag can also set, for each slot, the shape of the slot and the name of the recommended person group to be arranged. For example, in the template shown in FIG. 15, all slots have the "rectangle" shape, as indicated by the Shape tag in FIG. 16. As for the person group name, arranging "Main-Group" is recommended by the "PersonGroup" tag.

In addition, in the template shown in FIG. 17, the slot with ID=0 arranged at the center is described as a slot having the rectangle shape, as shown in FIG. 18. As for the person group, arranging "SubGroup" is recommended. The subsequent slots with ID=1, 2, . . . , have the ellipse shape. Arranging "MainGroup" as the person group is recommended.

In this embodiment, a number of such templates are held.

As described above, the application according to this embodiment can execute analysis processing for an input image group, automatically group persons, and display them on a UI. Viewing the result, the user can input attribute information such as a name and birthday for each person group and set the favorite rate or the like for each image.

It is also possible to hold a number of layout templates classified by the theme.

When the above-described conditions are satisfied, the application according to this embodiment performs, at a predetermined timing, processing of automatically generating a collage layout the user is likely to be fond of and presenting it to the user (to be referred to as layout proposal processing hereinafter).

Figure 6:
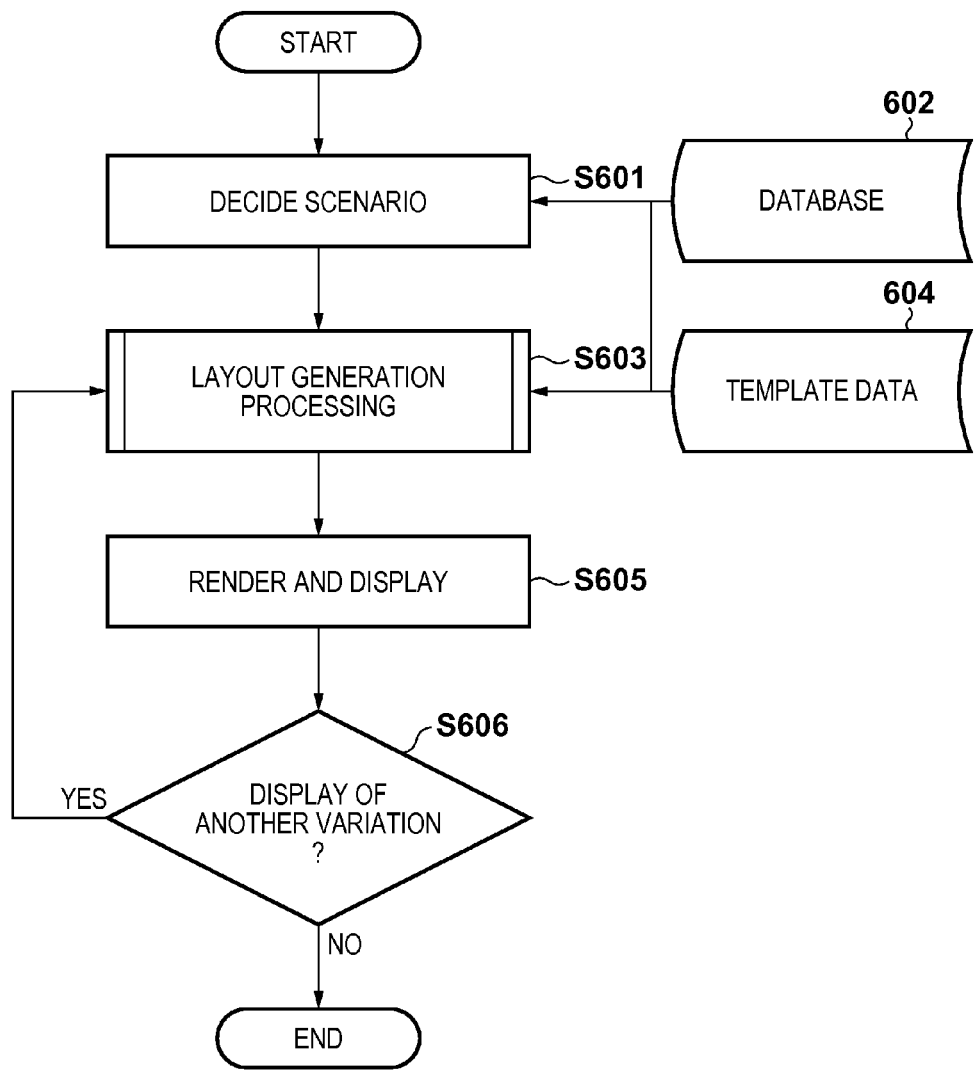
FIG. 6 is a flowchart of automatic layout proposal processing.

FIG. 6 illustrates the procedure of processing of determining a scenario for layout creation based on image analysis information and various kinds of information input by the user and automatically generating a layout based on the scenario. In step S601, the scenario of proposal processing is determined. The scenario includes the theme of the layout to be proposed, determination of a template, settings of a person (main character) to be emphasized in the layout, and selection information of an image group to be used for layout generation.

The determination of two scenarios will be described below.

For example, assume that setting is done in advance so as to automatically generate and present a collage layout two weeks before the birthday of a person "son" automatically grouped in FIG. 13. Two weeks before the first birthday of "son", theme decision, template selection, and image selection are performed. For the first birthday of "son", the theme of the layout to be proposed is determined as "growth". Next, a template is selected. In this case, a template as shown in FIG. 17 suitable for "growth" is selected, and "growth" is described in the Theme tag portion of XML, as shown in FIG. 25. Next, "son" is set as the main character "MainGroup" on which focus is placed at the time of layout. Then, "son" and "father" are set as "SubGroup" on which focus is secondarily placed at the time of layout. An image group to be used for layout is selected. In this example, a database 602 is referred to, and an enormous number of images including "son" are extracted and listed out of the images shot so far from the birthday of the person "son". The scenario determination for the growth layout has been described.

As an example different from that described above, assume that setting is done in advance so as to automatically generate and present a collage layout when there are travel photos shot within one month. Upon knowing, based on the event information registered in FIG. 12, that the family traveled several days ago, and an enormous number of images of the travel are saved in the secondary storage device 103, the layout generation unit 205 decides a scenario to propose a travel layout. In this case, the theme of the layout to be proposed is ddtermined as "travel". Next, a template is selected. In this case, a layout as shown in FIG. 15 is selected, and "travel" is described in the Theme tag portion of XML, as shown in FIG. 26. Then, "son", "mother", and "father" are set as the main character "MainGroup" on which focus is placed at the time of layout. In this way, a plurality of persons can be set as "MainGroup" by taking advantage of the characteristics of XML. Next, an image group to be used for layout is selected. In this example, the database 602 is referred to, and an enormous number of images linked with the travel event are extracted and listed. The scenario determination for the travel layout has been described.

Next, in step S603 of FIG. 6, automatic layout generation processing based on the above-described scenario is executed. The automatic layout generation processing based on the scenario will be described here with reference to FIG. 19. FIG. 19 illustrates the detailed processing procedure of the layout generation unit 205.

Referring to FIG. 19, in step S2101, layout template information 2102 determined by the above-described scenario generation processing after the layout theme and the person group information are set is acquired.

In step S2103, the feature amounts of each image are acquired from a database 2104 based on an image group list 2106 determined by the scenario, and an image group attribute information list is generated. The image group attribute information list has a structure in which the IMAGE-INFO tags shown in FIG. 10 are arranged as many as the number of image lists. The automatic layout generation processing in steps S2105 to S2109 is performed based on the image group attribute information list.

As described above, in the automatic layout generation processing of this embodiment, attribute information saved in the database in advance by performing sensing processing for each image is used, instead of directly handling the image data itself. This is because if the image data itself is used when performing the layout generation processing, a very large memory area is necessary for storing the image group. That is, using the attribute information stored in the database unit 202 as in this embodiment makes it possible to reduce the utilization of the memory area.

Figure 20:
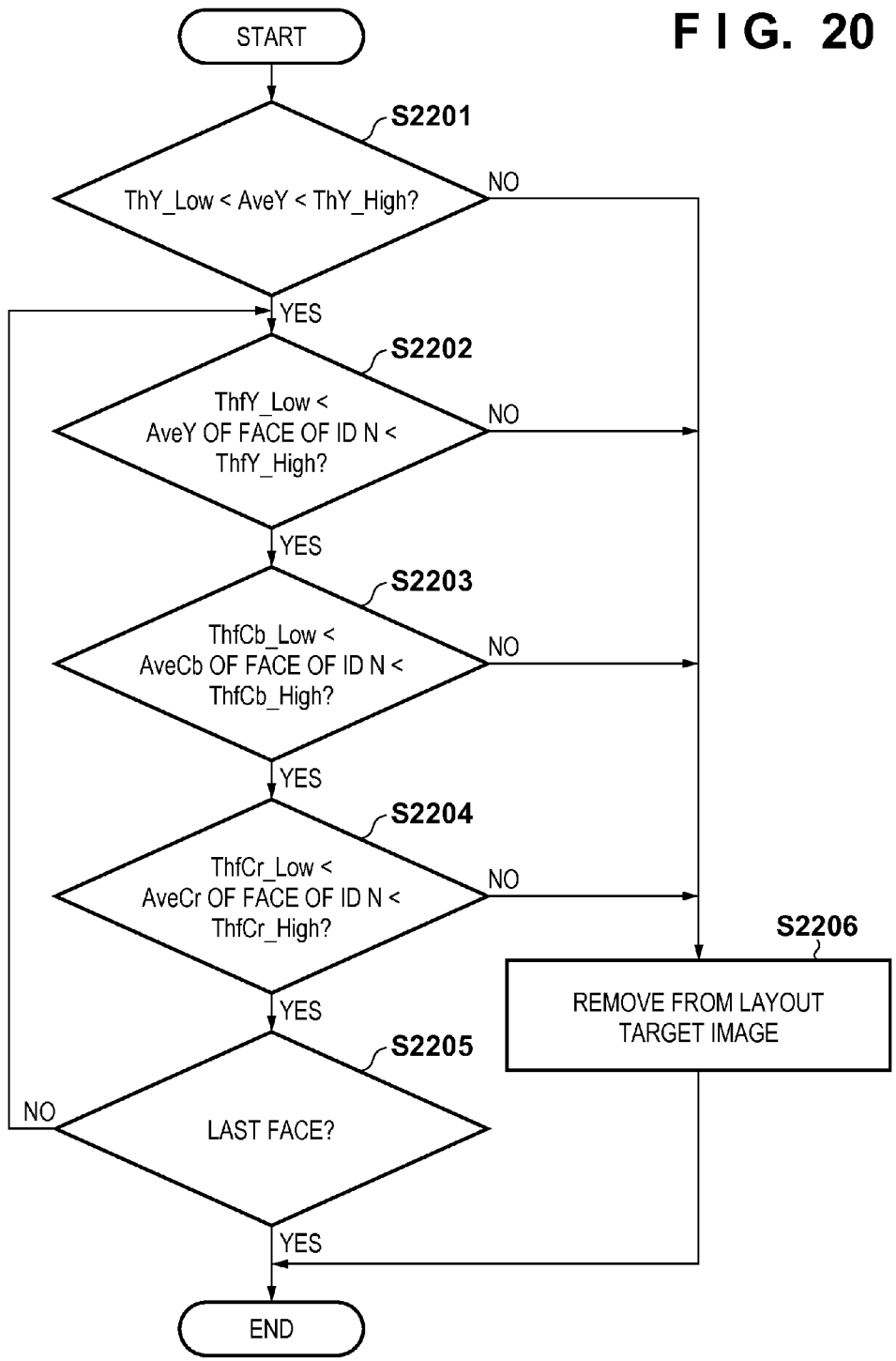
FIG. 20 is a flowchart of unnecessary image filtering processing according to the first embodiment.

In step S2105, unnecessary images are filtered from the input image group using the attribute information of the input image group. The filtering processing will be described here with reference to FIG. 20. FIG. 20 is a flowchart of the filtering processing. Referring to FIG. 20, in step S2201, it is determined for each image whether the average luminance of the entire image falls within the range of predetermined thresholds (ThY_Low and ThY_High). If NO in step S2201, the process advances to step S2206 to remove the image of interest from the layout target.

Similarly, in steps S2202 to S2205, whether the average luminance and average color difference components fall within the ranges of predetermined thresholds representing a satisfactory flesh color region is determined for each face region included in the image of interest. Only an image for which all determinations of steps S2202 to S2205 end with "YES" is applied to the subsequent layout generation processing.

More specifically, in step S2202, it is determined whether AveY of a face region with ID=N falls within the range of predetermined thresholds (ThfY_Low and ThfY_High). In step S2203, it is determined whether AveCb of the face region with ID=N falls within the range of predetermined thresholds (ThfCb_Low and ThfCb_High). In step S2204, it is determined whether AveCr of the face region with ID=N falls within the range of predetermined thresholds (ThfCr_Low and ThfCr_High). In step S2205, it is determined whether the face is the last face. If the face is not the last face, the process returns to step S2202. If the face is the last face, the processing ends.

Note that since this filtering processing aims at removing images that can obviously be determined as unnecessary for the subsequent temporary layout creation processing, the thresholds are can set relatively leniently. For example, when determining the luminance value of the entire image in step S2201, if the difference between ThY_High and ThY_Low is excessively smaller than the image dynamic range, the number of images determined as "YES" in each determination accordingly decreases. Hence, in the filtering processing of this embodiment, the difference between the thresholds is set as large as possible. In addition, thresholds that can remove an image that is obviously judged as an abnormal image are set.

Next, in step S2107 of FIG. 19, an enormous number of (L) temporary layouts are generated using the image group determined as the layout target by the above-described processing. Temporary layout generation is executed by repeating processing of arbitrarily applying an input image to an image arrangement frame of the acquired template.

Figure 21:
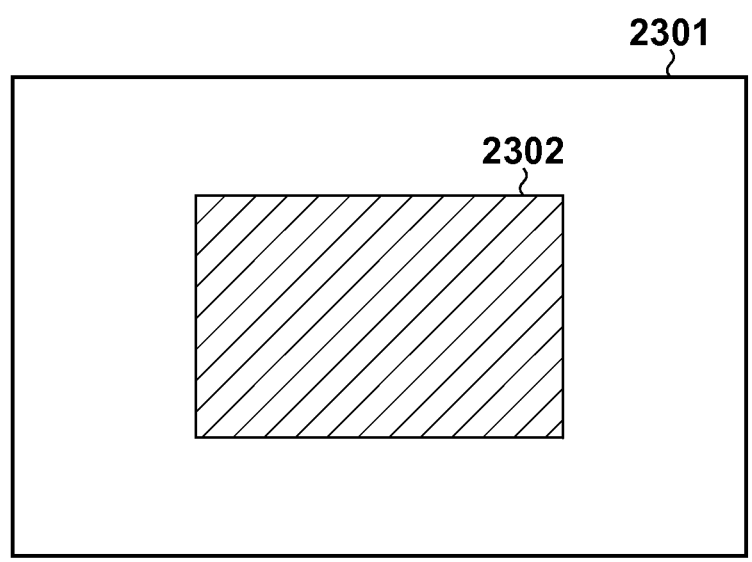
FIG. 21 is a view showing an example of automatic trimming processing.

When applying the input image to an image arrangement frame of the template, which image should be selected from the image group when N image arrangement frames exist in the layout is decided at random. In addition, which arrangement frames in a template should be used to arrange a plurality of selected images is decided at random. Furthermore, a trimming ratio representing the degree of trimming processing to be performed when the images are arranged is decided at random. Note that the trimming ratio is represented by, for example, 0% to 100%. An image is trimmed as shown in FIG. 21. Referring to FIG. 21, reference numeral 2301 denotes an entire image; and 2302, a cutting region for trimming at a trimming ratio of 50%.

In this embodiment, based on the above-described image selection/arrangement/trimming criterion, temporary layouts are generated as many as possible. The generated temporary layouts can be expressed by XML, as shown in FIG. 27. The ID of the image selected and arranged in each slot is described by the ImageID tag, and the trimming ratio is described by the TrimmingRatio tag.

Note that the number L of temporary layouts generated here is determined in accordance with the throughput of evaluation processing in a layout evaluation step to be described later and the performance of the information processing apparatus 115 that performs the processing. For example, several hundred thousand or more different temporary layouts can be prepared. Each generated temporary layout can be saved together with an ID in the secondary storage device 103 as a file using the XML format shown in FIG. 27, or stored on the RAM 102 using another data structure such as a structure.

Next, in step S2108 of FIG. 19, the L temporary layouts created above are evaluated using predetermined layout evaluation amounts. Table 3 shows a list of layout evaluation amounts according to this embodiment. As shown in Table 3, the layout evaluation amounts used in this embodiment can mainly be divided into three categories.

TABLE 3

| Category | Contents | Score range | Degree of importance for each theme (weight W) | |
|---|---|---|---|---|
| | | | growth | travel ... |
| individual image evaluation | brightness appropriateness | 0 to 100 | 0.5 | 1.0 |
| | saturation appropriateness | 0 to 100 | 0.5 | 1.0 |
| image/slot matching evaluation | person matching | 0 to 100 | 1.0 | 0.5 |
| | region of interest cutoff evaluation | 0 to 100 | 3.0 | 3.0 |
| in-page balance evaluation | image similarity | 0 to 100 | 0.5 | 1.0 |
| | hue variation | 0 to 100 | 0.5 | 1.0 |
| | face size variation | 0 to 100 | 0.5 | 1.0 |
| others | user's taste | 0 to 100 | 0.8 | 0.8 |

Figure 22:
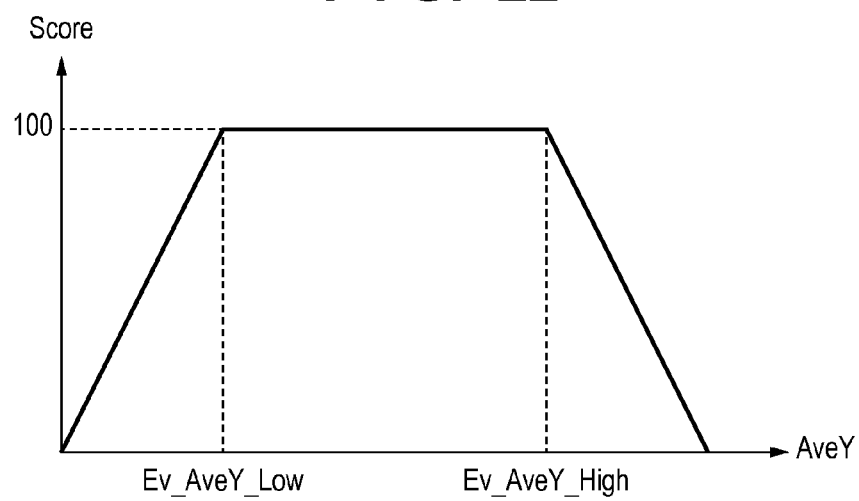
FIG. 22 is a graph for explaining a method of calculating brightness appropriateness.
Figure 23:
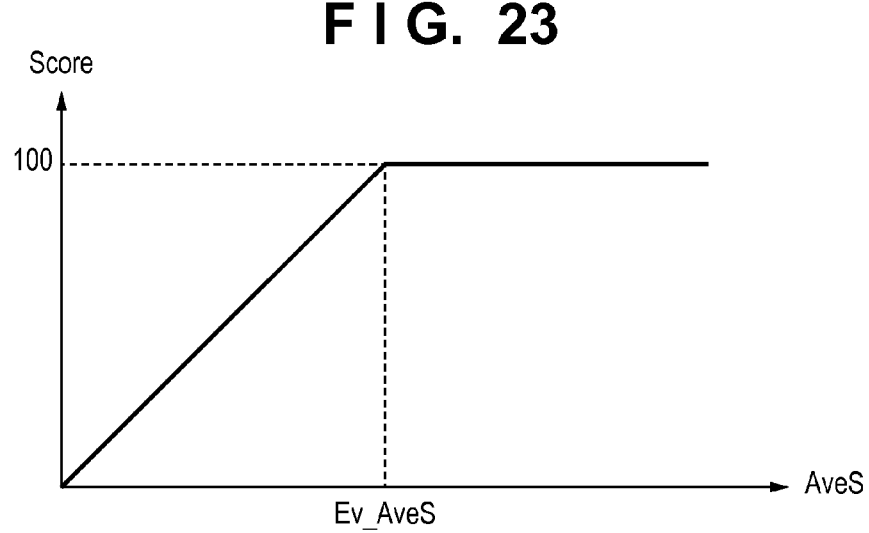
FIG. 23 is a graph for explaining a method of calculating saturation appropriateness.

The first evaluation category includes the evaluation amounts of each image. The evaluation amounts are used to determine states such as the brightness, saturation, and blur amount of an image and score the states. An example of scoring will be described below. FIG. 22 shows the brightness appropriateness. In the graph of FIG. 22, the ordinate represents the score, and the abscissa represents the average luminance (AveY). Referring to FIG. 22, the brightness appropriateness scores 100 when the average luminance falls within a predetermined range. The score is set so as to lower from 100 outside the predetermined threshold range. FIG. 23 shows the saturation appropriateness. In the graph of FIG. 23, the ordinate represents the score, and the abscissa represents the average saturation (Ave S). Referring to FIG. 23, the saturation appropriateness scores 100 when the average saturation of the entire image is larger than a predetermined saturation value. The score is set so as to gradually decrease when the average saturation is smaller than the predetermined value.

The second evaluation category is evaluation of matching between an image and a slot in a template (image/slot matching evaluation). This scores the degree of matching between an image and a slot.

In this embodiment, the evaluation value of the matching between an image and a slot is calculated using the above-described cutoff evaluation value. That is, it is determined whether, in an image arranged in an arrangement frame (slot)

of a template, a region of interest in the image is partially placed off the arrangement frame in the layout, and the region of interest is partially included in the arrangement frame. The matching between the image and the slot is evaluated based on the determination result. More specifically, the matching when the region of interest is partially placed off the arrangement frame is evaluated higher than in a case in which the region of interest is wholly placed off the arrangement frame or a case in which the region of interest is wholly included in the arrangement frame.

Another example of the image/slot matching evaluation value is person matching. The person matching represents the matching ratio of a person designated for a slot to a person who exists in the image actually arranged in the slot. For example, assume that "father" and "son" are designated for a slot by the PersonGroup tag designated by XML. At this time, when the two persons are displayed in the image assigned to the slot, the person matching of the slot has an evaluation value (score) of 100. If only one of the persons is displayed, the matching has an evaluation value of 50. If neither person is displayed, the person matching has an evaluation value of 0.

Referring to FIG. 30, when 3504 indicates "father", and 3506 indicates "son", the following result is obtained. In the trimming result 3508, since both the two persons "father" and "son" are displayed in the slot, the evaluation value of the person matching is 100. However, since cutoffs issue in 3503 and 3507, the cutoff evaluation value is 0. In 3511, since both "father" and "son" are displayed, the evaluation value of the person matching is 100. The cutoff evaluation value is also 100 because no cutoff issues in either region of interest. In 3514, since "son" is displayed, but "father" is not displayed, the evaluation value of the person matching is 50. The cutoff evaluation value is 100 because no cutoff issues in either region of interest. As described above, out of the trimming results 3508, 3511, and 3514, a trimming result that totally has the highest evaluation value is 3511 in which the designated persons are displayed in the slot, and no cutoff issues.

Note that the evaluation criterion of cutoff evaluation may be changed depending on whether the person whose face is cut off is the person designated for the slot. For example, in the above-described example, the cutoff evaluation value when the faces of "father" and "son" are cut off may be lower than that when the face of a person other than "father" and "son" is cut off.

Note that the matching in a page is the average value of the matchings calculated for the respective slots.

The third evaluation category evaluates the balance in a layout page. Table 3 shows image similarity, tone variation, and face size variation as the evaluation values used to evaluate the balance.

The image similarity will be described first. As the image similarity, the similarity between the images is calculated for each of the enormous number of generated temporary layouts. For example, if only similar images that resemble each other are arranged at the time of creating a layout of theme "travel", the layout may be not good. For example, the similarity can be evaluated by the shooting date/time. If the shooting dates/times of images are close, there is a high possibility that the images were shot at similar places. However, if the shooting dates/times are far off, both the scenes and the places are different at a high possibility.

The shooting date/time can be acquired from the attribute information of each image, which is saved in the database unit 202 in advance as image attribute information, as shown in FIG. 10. To obtain the similarity from the shooting dates/times, the following calculation is performed.

TABLE 4

| Image ID | Shooting date/time |
| --- | --- |
| 25 | 20100101: 120000 |
| 86 | 20100101: 150000 |
| 102 | 20100101: 170000 |
| 108 | 20100101: 173000 |

For example, assume that four images as shown in Table 4 are laid out in the temporary layout of interest. Note that in Table 4, capturing date/time information is added to each image specified by an image ID. More specifically, year/month/day and time (Christian Era year: YYYY, month: MM, day: DD, hour: HH, minute: MM, and second: SS) are added as a capturing date/time. At this time, the shortest capturing time interval between the four images is calculated. In this case, the time interval of 30 min between image ID "102" and image ID "108" is the shortest. This interval is set as MinInterval and stored in seconds. That is, 30 min=1800 sec. The MinInterval is calculated for each of the L temporary layouts and stored in an array stMinInterval[l]. A maximum value MaxMinInterval in stMinInterval[l] is obtained. A similarity evaluation value Similarity[l] of the lth temporary layout can be obtained by $$\text{Similarity}[l]=100 \times st\text{MinInterval}[l]/\text{MaxMinInterval}$$

That is, the value Similarity[l] is effective as the image similarity evaluation value because it is close to 100 as the minimum capturing time interval becomes large, and close to 0 as the time interval becomes small.

The tone variation will be explained next as the evaluation value used to evaluate the balance in a layout page. For example, if only images of similar colors (for example, blue of a blue sky, green of a mountain) are arranged at the time of creating a layout of theme "travel", the layout may be not good. Hence, the variance of the average hues AveH of images existing in the lth temporary layout of interest is calculated and stored as a hue variation tmpColorVariance[l]. A maximum value MaxColorVariance in tmpColorVariance[l] is obtained. A color variation evaluation value ColorVariance[l] of the lth temporary layout can be obtained by $$\text{ColorVariance}[l]=100 \times tmp\text{ColorVariance}[l]/\text{MaxColorVariance}$$

That is, the value ColorVariance[l] is effective as the hue variation evaluation value because it is close to 100 as the variation of the average hues of the images arranged in a page becomes large, and close to 0 as the variation of the average hues becomes small.

The face size variation will be explained next as the evaluation value used to evaluate the balance in a layout page. For example, if only images of similar face sizes are arranged in a layout result at the time of creating a layout of theme "travel", the layout may be not good. Assume that a good layout is obtained when images of a variety of face sizes, including small and large face sizes on a paper sheet after layout, are arranged in balance. In this case, the face size variation is set large. Hence, the variance of face sizes (the diagonal distance from the upper left to the lower right of a face position) arranged in the lth temporary layout of interest is stored as tmpFaceVariance[l]. A maximum value MaxFaceVariance in tmpFaceVariance[l] is obtained. A face size variation evaluation value FaceVariance[l] of the lth temporary layout can be obtained by $$\text{FaceVariance}[l]=100 \times tmp\text{FaceVariance}[l]/\text{MaxFaceVariance}$$

That is, the value FaceVariance[1] is effective as the face size variation evaluation value because it is close to 100 as the variation of the face sizes arranged on a paper sheet becomes large, and close to 0 as the variation of the face sizes becomes small.

As another category, user taste evaluation is usable.

The plurality of evaluation values described above, which are calculated for each temporary layout, will be integrated and referred to as a layout evaluation value for each temporary layout hereinafter. Let EvalLayout[1] be the integrated evaluation value of the lth temporary layout, and EvalValue [n] be N evaluation values (including the evaluation values shown in Table 3) calculated above. At this time, the integrated evaluation value can be obtained by $$EvalLayout\ [l] = \sum_{n=0}^{N} EvalValue\ [n] \times W[n]$$

where W[n] is the weight of each evaluation value of shown in Table 3 for each scene. As a characteristic feature, a different weight is set for each layout theme. For example, the themes "growth" and "travel" are compared, as shown in Table 3. For the theme "travel", a number of photos whose quality is as high as possible are laid out in a variety of scenes. Hence, settings are done to emphasize the individual evaluation values of the images and the in-page balance evaluation values. On the other hand, for "growth", whether the main character as the growth target properly matches each slot is more important than the image variation. Hence, settings are done to emphasize the image/slot matching evaluation more than in-page balance or the individual evaluation of images.

When the weight of the evaluation value of the cutoff in a region of interest is set high, as shown in Table 3, a layout with a little cutoff in a region of interest such as a person is preferentially obtained. As another example, when only the weight of the evaluation value of a cutoff in a region of interest is set to 1.0 or the like, and the weights of all the remaining items are set to 0, a layout result specialized to the cutoff in the region of interest can be obtained.

In step S2109, a layout list LayoutList[k] for layout result display is generated using EvalLayout[1] calculated in the above-described way. For the layout list, an identifier 1 is stored in descending order of evaluation value out of EvalLayout[1] for a predetermined number of (for example, five) layouts. For example, if the temporary layout created for the 50th time has the highest score, layout list LayoutList[0]=50. Similarly, after the layout list LayoutList[1], the identifier 1 for the second highest score is stored.

The flowchart of FIG. 19 has been described above.

Next, the layout result obtained by the processing described with reference to FIG. 19 is displayed in step S605 of FIG. 6. In this embodiment, the result is displayed on a UI 2901 shown in FIG. 24. In step S605, the layout identifier stored in LayoutList[0] is read out, and the temporary layout result corresponding to the identifier is read out from the secondary storage device 103 or RAM 102. In the layout result, as described above, template information and image names assigned to the respective slots existing in the template are set. In step S605, the layout result is rendered based on these pieces of information using the rendering function of the OS operating on the information processing apparatus 115 and displayed, as indicated by a layout 2902 in FIG. 24.

When the user presses a Next button 2904 in FIG. 24, the identifier of layout list LayoutList[1] of the next score is read out. The layout result is rendered and displayed in the same manner as described above. This allows the user to view variations of proposed layouts. The user can also redisplay the layout displayed previously by pressing a Previous button 2903. If the user likes the displayed layout, he/she can press a print button 2905 to cause the printer 112 connected to the information processing apparatus 115 to print the layout 2902.

As described above, according to this embodiment, a layout in which images are arranged on a template is evaluated as an output target depending on whether a region of interest in the image arranged in each arrangement frame (slot) of the template is cut off on the arrangement frame. More specifically, it is determined whether the region of interest is partially located off the arrangement frame in the layout and partially included in the arrangement frame. The matching when the region of interest is partially placed off the arrangement frame is evaluated higher than in a case in which the region of interest is wholly placed off the arrangement frame or a case in which the region of interest is wholly included in the arrangement frame. This makes it possible to prevent a layout from being output in a state in which a region of interest such as a person's face included in the image is cut off.

In addition, as described above, the evaluation criterion in case of a cutoff in the region of interest may be changed depending on the type of the region of interest. For example, when a person corresponding to the region of interest is a specific person, the evaluation value is set lower than that when a region of interest that is not the specific person is cut off. The specific person is, for example, a person designated for a slot of a template or a person registered in the face dictionary. This makes it possible to prevent a layout from being output in a state in which a specific person's face included in the image is partially cut off.

<Second Embodiment>

In the above-described first embodiment, cutoff evaluation is performed as part of layout evaluation after an enormous number of temporary layouts are created. In the second embodiment, when creating a layout, it is created such that regions of interest are not cut off. More specifically, a number of trimming region candidates are set for arrangement candidate images to be arranged on a template, and the above-described cutoff evaluation is then performed. The trimming regions have the same aspect ratio as a slot, and candidates in various sizes are set. In this embodiment, the trimming regions are set from a small area. Cutoff evaluation is performed by setting a trimming region from the coordinates of the upper left corner of an image. If the cutoff evaluation value for the set trimming region candidate is higher than a predetermined threshold, the layout is set as a temporary layout candidate. The position is moved on a pixel basis rightward from the coordinates of the upper left. When the evaluation has been done up to the rightmost coordinate, the position is shifted downward from the upper left by one pixel and then moved rightward again to perform evaluation. When the evaluation has been done in the whole region of the image, the area of the trimming region is increased, and the evaluation is performed in a similar way.

When the cutoff evaluation is performed in this way, and a layout is created using one of the trimming candidates with cutoff evaluation values equal to or higher than the threshold, trimming that causes a cutoff in the region of interest hardly issues.

In addition, according to this embodiment, with the cutoff evaluation of the region of interest, temporary layouts can be narrowed down to layouts without any cutoff in the region of interest. Since the evaluation targets of layout evaluation processing in step S3307 of FIG. 28 can be narrowed down, the layout evaluation processing can be facilitated.

<Other Embodiments>

The present invention is also applicable to a system including a plurality of devices (for example, host computer, interface device, reader, and printer) or an apparatus (for example, printer, copying machine, or facsimile apparatus) including a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154004, filed Jul. 9, 2012, which is hereby incorporated by reference herein in its entirety.

What is claimed is:

1. An apparatus comprising:
a specifying unit configured to specify at least one object from an image;
a first determination unit configured to determine whether the object specified in the image by said specifying unit is divided by an output target region having a predetermined aspect ratio, the output target region being set so that the entirety of the output target region is included in the image; and
a second determination unit configured to determine the output target region in the image based on a determination result by said first determination unit so that a first region, that includes the entirety of a first object and does not include a second object, is determined as the output target region preferentially to a second region that divides each of the first object and the second object.

2. The apparatus according to claim 1, further comprising a setting unit configured to set a plurality of candidates of the output target region in the image,
wherein said first determination unit determines, for the plurality of candidates set by said setting unit, whether the object is divided, and
in a case where the first region and the second region are set as the plurality of candidates by the setting unit, said second determination unit determines the first region as the output target region.

3. The apparatus according to claim 2, wherein said second determination unit determines, as the output target region, an arrangement target region having the predetermined aspect ratio in a case where an image of the candidate of the output target is arranged on a template.

4. The apparatus according to claim 3, further comprising a generation unit configured to generate a layout in which the image is arranged on the template,
wherein said second determination unit determines an output target layout from a plurality of layouts generated by said generation unit based on the output target region corresponding to the image arranged in each of the plurality of layouts.

5. The apparatus according to claim 4, further comprising a display control unit configured to cause a display device to display the output target layout sequentially determined from the plurality of layouts by said second determination unit.

6. The apparatus according to claim 1, wherein said second determination unit determines the output target region such that the object is wholly included in the output target region.

7. The apparatus according to claim 1, wherein the specifying unit specifies at least one object corresponding to a person, and the second determination unit determines the output target region in the image, based on a determination result by the first determination unit and based on whether or not the person corresponding to the object has been registered by a user.

8. The apparatus according to claim 7, wherein the specifying unit specifies an object corresponding to a person who has been registered, and does not specify another object corresponding to another person who has not been registered.

9. The apparatus according to claim 7, wherein said specifying unit specifies a face region included in the image as the object.

10. The apparatus according to claim 9, wherein said second determination unit determines the output target region in the image in accordance with the contents of the face region in a case where said first determination unit determines that the face region in the image is divided.

11. A method comprising the steps of:
specifying at least one object from an image;
determining in a first determining step whether the object specified in the image in the specifying step is divided by an output target region having a predetermined aspect ratio, the output target region being set so that the entirety of the output target region is included in the image; and
determining in a second determining step the output target region in the image based on a determination result in the first determining step so that a first region, that includes the entirety of a first object and does not include a second object, is determined as the output target region preferentially to a second region that divides each of the first object and the second object.

12. The method according to claim 11, further comprising the step of setting a plurality of candidates of the output target region in the image,
wherein in the first determining step, it is determined, for the plurality of candidates set in the setting step, whether the object region is divided, and
in a case where the first region and the second region are set as the plurality of candidates in the setting step, in the second determining step, the first region is determined as the output target region.

13. The method according to claim 11, wherein in the second determining step, the output target region is determined such that the object is wholly included in the output target region.

14. The method according to claim 11, wherein in the second determining step, an arrangement target region having the predetermined aspect ratio in a case where an image of the candidate of the output target is arranged on a template.

15. The method according to claim 14, further comprising the step of generating a layout in which the image is arranged on the template,
wherein in the second determining step, an output target layout is determined from a plurality of layouts generated in the generating step based on the output target region corresponding to the image arranged in each of the plurality of layouts.

16. The method according to claim 15, further comprising the step of causing a display device to display the output target layout sequentially determined from the plurality of layouts in the deciding.

17. A non-transitory computer-readable medium storing a program that causes a computer to execute a method of claim 11.

18. The method according to claim 11, wherein in the specifying step, at least one object corresponding to a person is specified, and in the second determining step, the output target region in the image is determined, based on a determination result in the first determining step and based on whether or not the person corresponding to the object has been registered by a user.

19. The method according to claim 18, wherein in the specifying step, an object corresponding to a person who has been registered is specified, and another object corresponding to another person who has not been registered is not specified.

20. The method according to claim 18, wherein in the specifying step, a face region included in the image is specified as the object.

21. The method according to claim 20, wherein in the second determining step, the output target region in the image is determined in accordance with contents of the face region in a case where it is determined in the first determining step that the face region in the image is divided.

\* \* \* \* \*